US012386500B2

(12) United States Patent
Gao et al.

(10) Patent No.: US 12,386,500 B2
(45) Date of Patent: Aug. 12, 2025

(54) METHOD, AN APPARATUS, AN ELECTRONIC DEVICE AND A STORAGE MEDIUM FOR SHARING MULTIMEDIA INFORMATION IN SOCIAL MEDIA

(71) Applicant: BEIJING BYTEDANCE NETWORK TECHNOLOGY CO., LTD., Beijing (CN)

(72) Inventors: Ruie Gao, Beijing (CN); Yiyun Long, Beijing (CN); Jingran Zhou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 52 days.

(21) Appl. No.: 17/534,731

(22) Filed: Nov. 24, 2021

(65) Prior Publication Data

US 2022/0253492 A1    Aug. 11, 2022

(30) Foreign Application Priority Data

Feb. 9, 2021    (CN) .......................... 202110177522.9

(51) Int. Cl.
*G06F 3/04883*    (2022.01)
*G06F 3/04817*    (2022.01)
(Continued)

(52) U.S. Cl.
CPC ...... *G06F 3/04883* (2013.01); *G06F 3/04817* (2013.01); *G06F 3/0483* (2013.01);
(Continued)

(58) Field of Classification Search
CPC ............. G06F 16/9535; G06F 3/04817; G06F 3/0483; G06F 3/04845; G06F 3/04883; H04L 51/04; H04L 65/60; H04N 21/47205
See application file for complete search history.

(56) References Cited

U.S. PATENT DOCUMENTS 10,623,917 B1 *   4/2020  Paul ..................... G06F 16/9535
10,904,193 B1 *   1/2021  Al Majid .............. H04L 51/224
(Continued)

FOREIGN PATENT DOCUMENTS

CN          101977238 A       2/2011
CN          102447647 A       5/2012
(Continued)

OTHER PUBLICATIONS

Author: Howfinity Title: How to Use Instagram Stories Date: Aug. 19, 2019 pp. 1-33 (Year: 2019).*
(Continued)

*Primary Examiner* — Irete F Ehichioya
*Assistant Examiner* — Phoebe X Pan

(57) ABSTRACT

The present disclosure discloses a method, an apparatus, an electronic device, and a storage medium for multimedia information processing. The present disclosure enables users to discover in time that themselves and/or their associated users have updated and released first multimedia information by displaying on a first page a first identification used to identify that one or more users have updated and released the first multimedia information. Further, when a trigger operation for the first identification is detected, user identifications corresponding to one or more users who have updated and released the first multimedia information respectively are displayed. When a trigger operation for a user identification of a target user among one or more users
(Continued)

is detected, first multimedia information that the target user has updated and released is displayed.

16 Claims, 10 Drawing Sheets

(51) Int. Cl.
*G06F 3/0483* (2013.01)
*G06F 3/04842* (2022.01)
*G06F 3/04845* (2022.01)
*H04L 51/04* (2022.01)

(52) U.S. Cl.
CPC ...... *G06F 3/04842* (2013.01); *G06F 3/04845* (2013.01); *H04L 51/04* (2013.01)

(56) References Cited

U.S. PATENT DOCUMENTS

| | | | | |
|---|---|---|---|---|
| 10,956,029 | B1* | 3/2021 | O'Rourke | G06F 9/451 |
| 11,695,723 | B2* | 7/2023 | Sachdeva | H04L 51/08 |
| | | | | 709/206 |
| 2012/0236037 | A1* | 9/2012 | Lessing | G06F 3/0485 |
| | | | | 345/661 |
| 2012/0254765 | A1* | 10/2012 | Apfel | H04L 67/306 |
| | | | | 715/739 |
| 2014/0075383 | A1* | 3/2014 | Zheng | G06F 9/451 |
| | | | | 715/810 |
| 2014/0129627 | A1* | 5/2014 | Baldwin | H04L 67/306 |
| | | | | 709/204 |
| 2014/0189596 | A1 | 7/2014 | Taniuchi | |
| 2014/0304646 | A1 | 10/2014 | Rossman | |
| 2014/0379801 | A1* | 12/2014 | Gupta | H04N 21/4126 |
| | | | | 709/204 |
| 2016/0018913 | A1* | 1/2016 | Zhang | G06F 3/03547 |
| | | | | 345/173 |
| 2016/0048316 | A1* | 2/2016 | Bae | H04M 1/724 |
| | | | | 715/781 |
| 2016/0132231 | A1* | 5/2016 | Rathod | G06F 3/16 |
| | | | | 715/727 |
| 2016/0275167 | A1 | 9/2016 | Scherpa et al. | |
| 2016/0373383 | A1 | 12/2016 | Pinkovezky et al. | |
| 2017/0093777 | A1 | 3/2017 | Neustifter et al. | |
| 2017/0173476 | A1* | 6/2017 | Schindler | G06Q 30/0261 |
| 2018/0097764 | A1 | 4/2018 | Lutsenko et al. | |
| 2020/0366963 | A1 | 11/2020 | Liao | |
| 2021/0127150 | A1* | 4/2021 | Alagarsamy | H04N 21/2402 |
| 2022/0329548 | A1 | 10/2022 | Kim et al. | |
| 2022/0365647 | A1* | 11/2022 | Xu | G06F 3/0486 |
| 2024/0155011 | A1 | 5/2024 | Kurabuchi | |

FOREIGN PATENT DOCUMENTS

| | | |
|---|---|---|
| CN | 105723727 A | 6/2016 |
| CN | 106371789 A | 2/2017 |
| CN | 108063863 A | 5/2018 |
| CN | 109274581 A | 1/2019 |
| CN | 112100534 A | 12/2020 |
| CN | 112953814 A | 6/2021 |
| JP | 2014-127144 A | 7/2014 |
| JP | 2020-068040 A | 4/2020 |
| JP | 67-083919 B1 | 11/2020 |
| JP | 2015-527678 A | 9/2024 |
| WO | 2014/041426 A1 | 3/2014 |

OTHER PUBLICATIONS

Author: Howfinity Title: How to Use Instagram Stories—Complete Beginner's Guide Date: Aug. 19, 2019 pp. 1-34 (Year: 2019).*
Office Action issued Jul. 13, 2022 for CN Application No. 202110177522.9.
International Search Report issued Apr. 20, 2022 in International Application No. PCT/CN2022/072668.
Khamosh Pathak , How to Turn on Notifications for Instagram Posts, Stories, Live, and IGTV, Jan. 23, 2021.
Extended European Search Report mailed May 31, 2024 in European Application No. 22752091.3.
Written Opinion for International Application No. PCT/CN2022/072668, mailed Apr. 20, 2022, 09 Pages.
"Line & Instagram & Facebook & Twitter", Mini, Jul. 30, 2002, pp. 1-4.
"Line/Facebook/Twitter/Instagram", MOOK, pp. 1-4.
Office action received from Japanese patent application No. 2023-547763 mailed on Aug. 27, 2024, 9 pages (4 pages English Translation and 5 pages Original Copy).
Office action received from Japanese patent application No. 2023-547763 mailed on Mar. 4, 2025, 6 pages (3 pages English Translation and 3 pages Original Copy).
Ogawa, "What is a story? How do you use it?", Youtube, Retrieved from the link: "youtube.com/watch?v=4c2ideldPog&t=| 95s", Jun. 2017, pp. 1-8.

* cited by examiner

METHOD, AN APPARATUS, AN ELECTRONIC DEVICE AND A STORAGE MEDIUM FOR SHARING MULTIMEDIA INFORMATION IN SOCIAL MEDIA

CROSS REFERENCE TO RELATED APPLICATIONS

This application is based on and claims priority to CN application with application No. 202110177522.9 filed on Feb. 9, 2021, the entire disclosure of which is hereby incorporated by reference.

TECHNICAL FIELD

The present disclosure relates to the field of information technology, and in particular to a method, an apparatus, an electronic device, and a storage medium for multimedia information processing.

BACKGROUND

With the increasing development of information technology, people can communicate and interact through various social platforms.

For example, users can share multimedia information they have created with their associated users on social platforms for viewing. The associated users, however, cannot see the multimedia information shared by these users through terminals in time, resulting in poor user experience.

SUMMARY

In order to solve above technical problems or at least partially solve above technical problems, embodiments of the present disclosure provide a method, an apparatus, an electronic device, and a storage medium for multimedia information processing, so that users can see first multimedia information updated and released by themselves and/or their associated users in time.

Some embodiments of the present disclosure provide a method for multimedia information processing, comprising:

displaying a first page, the first page includes a first identification, the first identification is used to identify that one or more users have updated and released first multimedia information, and the one or more users include a first user and/or one or more second users, and the one or more second users include associated users of the first user;

detecting a trigger operation for the first identification, displaying user identifications corresponding to the one or more users respectively;

detecting a trigger operation for a user identification of a target user among the one or more users, displaying the first multimedia information that has been updated and released by the target user.

Some embodiment of the present disclosure further provides an apparatus for multimedia information processing, comprising:

a first display module, used for displaying a first page, the first page includes a first identification, the first identification is used to identify that one or more users have updated and released first multimedia information, and the one or more users includes a first user and/or one or more second users, and the one or more second users include associated user of the first user;

a second display module, used for displaying user identifications corresponding to the one or more users respectively when a trigger operation for the first identification is detected;

a third display module, used for displaying the updated and released first multimedia information of a target user when a trigger operation for the user identification of the target user among the one or more users is detected.

Some embodiment of the present disclosure further provides an electronic device, the electronic device comprising:

one or more processors;

a storage apparatus for storing one or more programs;

the one or more programs, when executed by the one or more processors, cause the one or more processors implement the method for multimedia information processing as described above. Some embodiment of the present disclosure further provides a computer readable storage medium having a computer program stored thereon, which, when executed by a processor, implements the method for multimedia information processing as described above.

Some embodiment of the present disclosure further provides a computer program product, the computer program product including a computer program or instruction, which, when executed by a processor, implement the method for multimedia information processing as described above.

DRAWINGS

The above and other features, advantages, and aspects of the embodiments of the present disclosure will become more apparent in conjunction with the accompanying drawings and with reference to the following specific implementations. Throughout the drawings, like or similar reference signs indicate like or similar elements. It should be understood that the drawings are schematics and the originals and elements are not necessarily drawn to scale.

DETAILED DESCRIPTION

Figure 1:
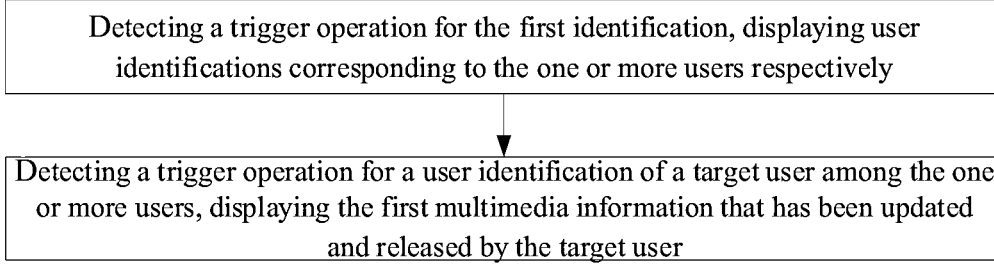
FIG. 1 is a flowchart of a method for multimedia information processing in an embodiment of the disclosure.

Hereinafter, embodiments of the present disclosure will be described in more detail with reference to the accompanying drawings. Although some embodiments of the present disclosure are shown in the drawings, it should be understood that the present disclosure can be implemented in various forms and should not be construed as being limited to embodiments set forth herein, rather, these embodiments are provided for a more thorough and complete understanding of the present disclosure. It should be understood that the drawings and embodiments of the present disclosure are only used for exemplary purposes, and are not used to limit the protection scope of the present disclosure.

It should be understood that various steps recorded in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustrative purposes, and are not used to limit the scope of these messages or information.

FIG. 1 is a flowchart of a method for multimedia information processing in an embodiment of the disclosure. This embodiment is applicable to a scenario of performing multimedia information processing in a client. The method can be performed by an apparatus for multimedia information processing, which can be implemented by a way of employing software and/or hardware, and can be configured in an electronic device, for example, a terminal, including but not limited to a smart phone, a handheld computer, a tablet, a wearable device with a display, a desktop computer, a notebook, an all-in-one computer, a smart home appliance, etc. Alternatively, this embodiment is applicable to a scenario of performing multimedia information processing in a server. The method can be performed by an apparatus for multimedia information processing, which can be implemented by a way of employing software and/or hardware, and can be configured in an electronic device, for example, a server. As shown in FIG. 1, specifically, the method can comprise:

S101. displaying a first page, the first page includes a first identification, the first identification is used to identify that one or more users have updated and released first multimedia information, and the one or more users include a first user and/or one or more second users, and the one or more second users include associated users of the first user.

Figure 2:
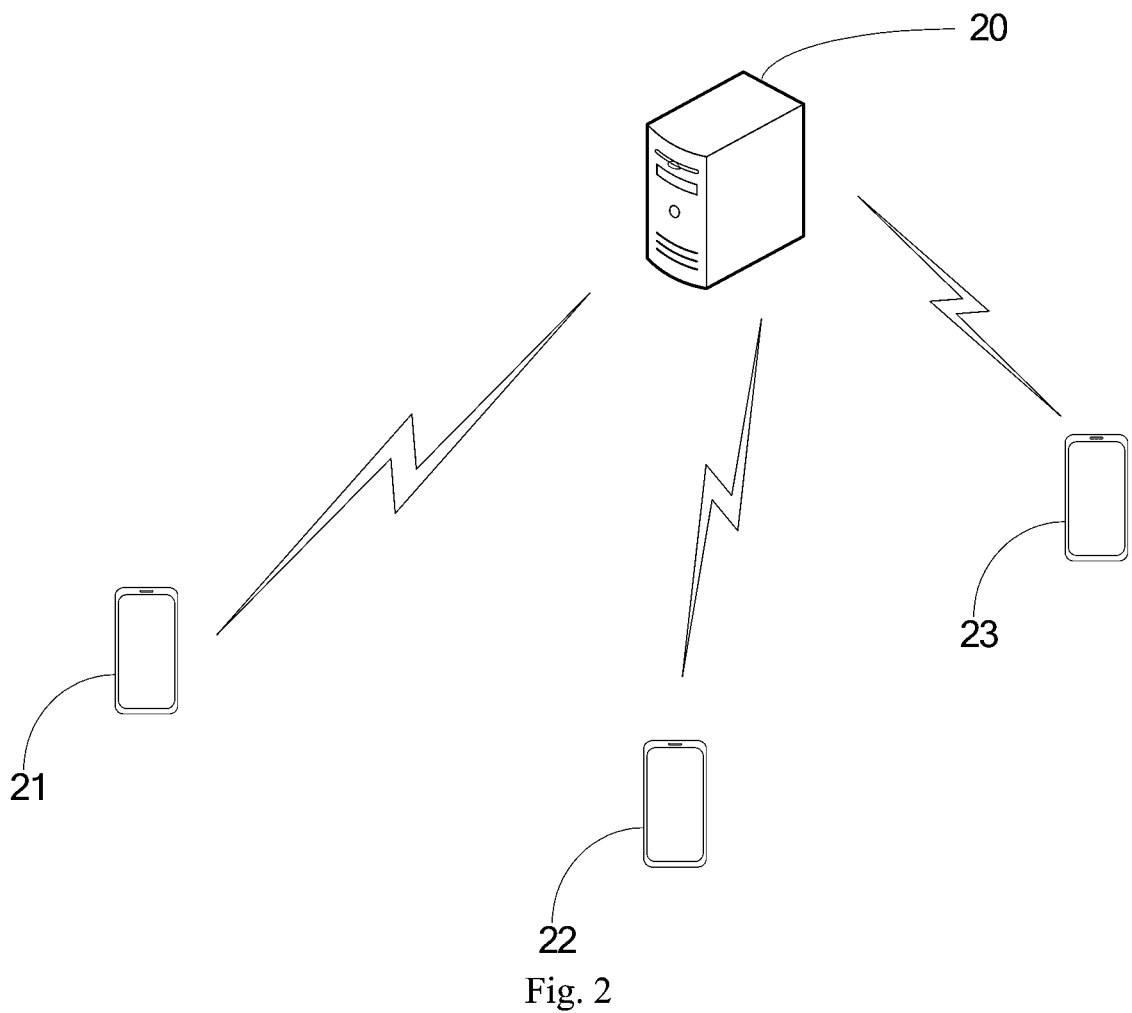
FIG. 2 is a schematic diagram of an application scenario in an embodiment of the disclosure.

As shown in FIG. 2, a terminal 21, a terminal 22, and a terminal 23 can communicate with a server 20, respectively. In one possible implementation, the terminal 21, the terminal 22, and the terminal 23 may be installed with an application (APP) respectively, and the server 20 may be a server corresponding to the application. That is, the server 20 can provide application services to a user of a terminal through the application. It can be understood that the application scenario shown in FIG. 2 is only a schematic illustration and is not specifically limited. In addition, this embodiment does not limit the application specifically, for example, the application program may be an application with a communication function, and users corresponding to the terminal 21, terminal 22, and terminal 23 can communicate with each other through the application. In addition, users of different terminals can also be associated. For example, the user of the terminal 21 can follow the users of other terminals in one direction through the application, or users of different terminals can follow each other in both directions through the application. For example, the user of terminal 21 may be denoted as user A, the user of terminal 22 may be denoted as user B, and the user of terminal 23 may be denoted as user C. User B and user C are associated users of user A, respectively.

Figure 3:
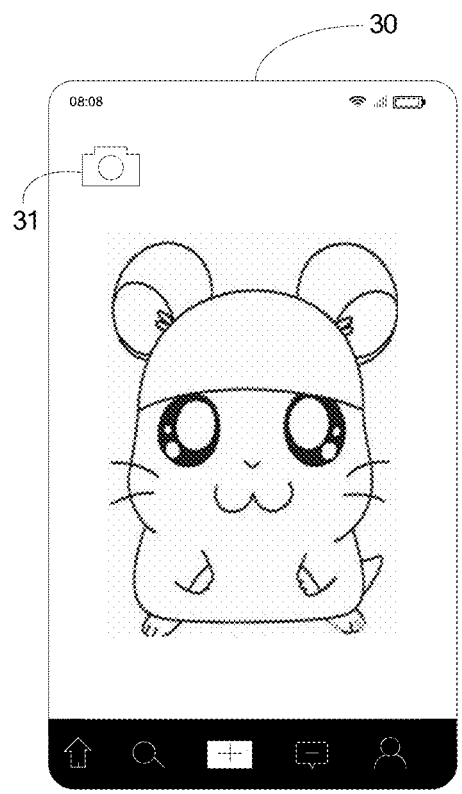
FIG. 3 is a schematic diagram of a user page in an embodiment of the disclosure.
Figure 4:
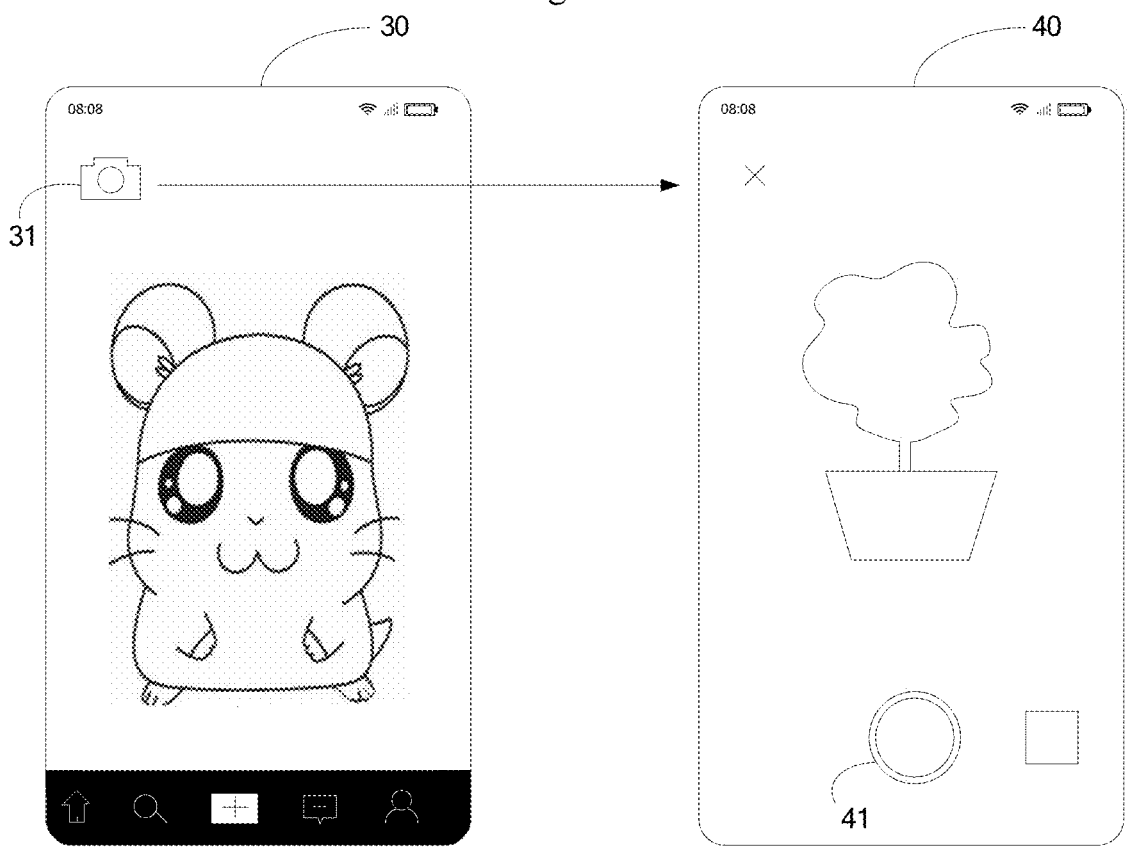
FIG. 4 is a schematic diagram of another user page in an embodiment of the disclosure.

This embodiment takes the user page of the terminal 21 as an example for illustrative description, for example, the user page shown in FIG. 3 is a schematic diagram of the user page of the terminal 21. As shown in FIG. 3, a user page 30 can be donated as the first page, and the first page 30 can be a home page of the application as described above, and the home page can be a page that can play a stream of multi-card aggregate Feed after the application is started. As shown in FIG. 3, the first page 30 includes a camera identification 31. When the terminal 21 detects a trigger operation for the camera identification 31, the terminal 21 may switch the first page 30 displayed in a display component to a second page 40 as shown in FIG. 4. The second page 40 may specifically be a shooting page, for example, the second page 40 includes a shooting button 41, when the terminal 21 detects a trigger operation for the shooting button 41, the terminal 21 may control the shooting component to shoot objects within the shooting range. In this embodiment, the trigger operation may not be limited to tap, double tap, slide, long press, voice control, gesture control, expression control, and so on. The display component may specifically include components or modules with display functions, such as a display screen, a touch screen, and the like. The shooting component may specifically include components or modules with shooting functions, such as a camcorder, a webcam and a camera. The display component and the shooting component may be integrated in the terminal 21, or may be set independently of the terminal 21 and maintain a communication connection or an electrical connection with the terminal 21.

Specifically, after the shooting component is controlled by the terminal 21 controls to shoot objects within the shooting range, corresponding image information or video information may be generated. Further, when the terminal 21 receives a sending instruction for the image information or video information, the terminal 21 may send the image information or video information to the server 20. Alternatively, after the shooting component is controlled by the terminal 21 to shoot objects within the shooting range, the user A of the terminal 21 can edit the image information or video information obtained by the shooting through the application, and further, the terminal 21 send the image information or video information that has been edited by the user A to the server 20. Regarding the image information or video information uploaded by the terminal 21, the server 20 can communicate with terminals of other users associated with the user A, such as the terminal 22 and the terminal 23, so that the terminal 22 and the terminal 23 can prompt user B and user C, respectively, for updating and releasing the multimedia information by the user A. It should be understood that multimedia information is not limited to image information and video information, and may also include text information, audio information, or a combination information of at least two of text information, audio information, image information, and video information, for example.

Similarly, when other users associated with user A, such as user B and/or user C, update and release multimedia information, terminal 21 may also prompt user A for updating and releasing multimedia information by user B and/or user C. This embodiment does not limit the specific prompt approach, for example, it may be voice prompt, text prompt, vibration prompt, and so on. Specifically, in this embodiment, the user A may be prompted through a first page. For example, the first page may include a first identification, and the first identification may identify that one or more users have updated and released multimedia information, wherein the multimedia information here is donated as first multimedia information. The one or more users here may include a first user and/or one or more second users, for example, the first user may be user A, and user B and user C are second users respectively, namely, user B and user C respectively are associated users of user A. Here, as an example, the user A has multiple associated users, in some other embodiments, the user A may also have one associated user. Specifically, the first identification can not only identify that other users associated with user A have updated and released multimedia information, but also can identify that user A himself has updated and released multimedia information. That is, as long as the terminal 21 detects that user A and/or other users associated with user A have updated and released multimedia information, it can be identified by the first identification. Specifically, the server or terminal can detect in real time whether there is a user updating and releasing multimedia information, or it can also periodically detect whether there is a user updating and releasing multimedia information.

Figure 5:
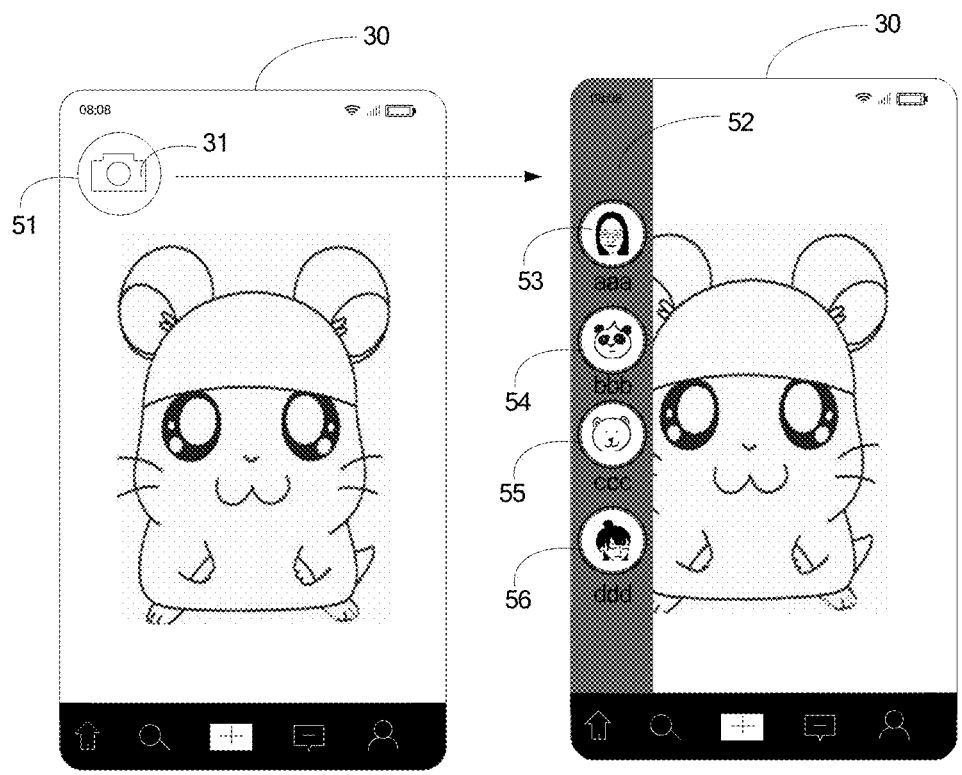
FIG. 5 is a schematic diagram of another user page in an embodiment of the disclosure.

Specifically, the first identification can have a variety of exhibition forms, and several possible implementations are described below:

As one possible implementation, the first identification may be obtained by changing on the basis of the camera identification 31 as shown in FIG. 3. Specifically, the first identification may be the first identification 51 as shown in FIG. 5. For example, in the case that user A and/or other users associated with user A have updated and released multimedia information, the terminal 21 may control the camera identification 31 in the first page 30 to become the first identification 51. In the case that user A and/or other users associated with user A do not update and release the multimedia information, the first page 30 may display the camera identification 31 as shown in FIG. 3, and when the terminal 21 detects a trigger operation, such as a click, for the camera identification 31, the terminal 21 can switch the first page 30 displayed in the display component to the second page 40 as shown in FIG. 4. In addition, in some other embodiments, the terminal 21 may also switch the first page 30 to the second page 40 when a trigger operation, such as sliding the screen to the right, for the first page 30 is detected.

Figure 6:
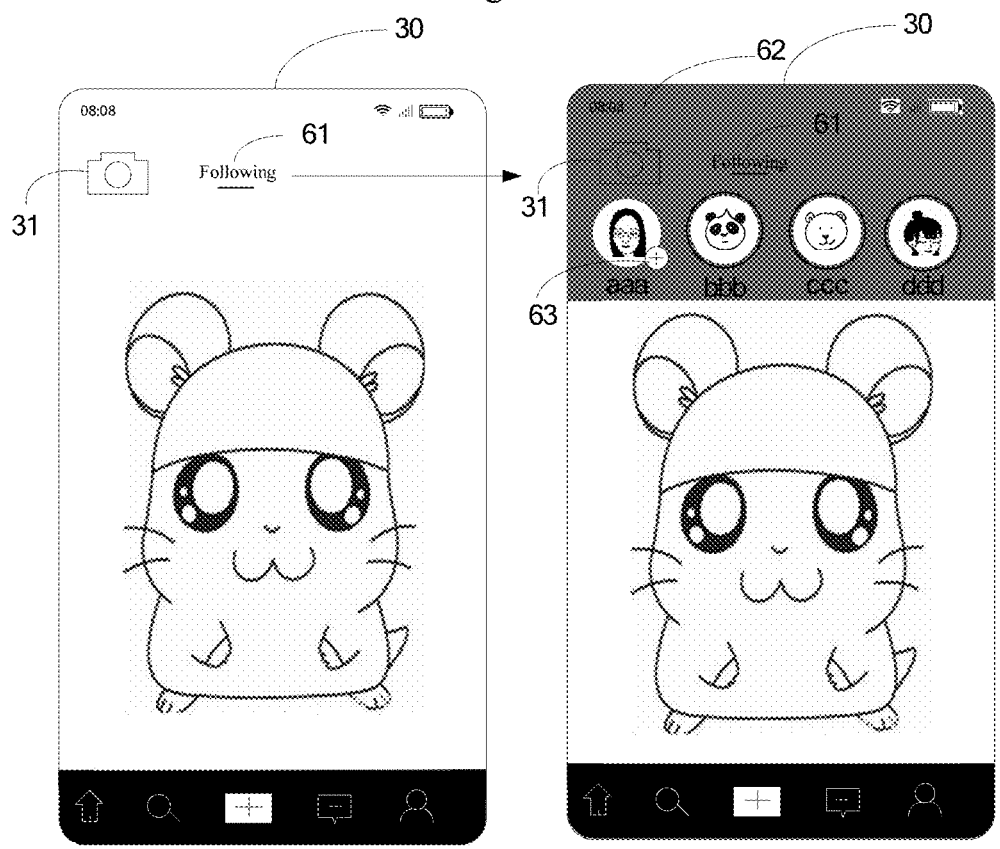
FIG. 6 is a schematic diagram of another user page in an embodiment of the disclosure.

As another possible implementation, the first identification may be a first identification 61 (for example, a text identification) as shown in FIG. 6. For example, in the case that user A and/or other users associated with user A have updated and released multimedia information, the terminal 21 may add additional identifications, such as small dots, on the basis of the first identification 61.

Figure 7:
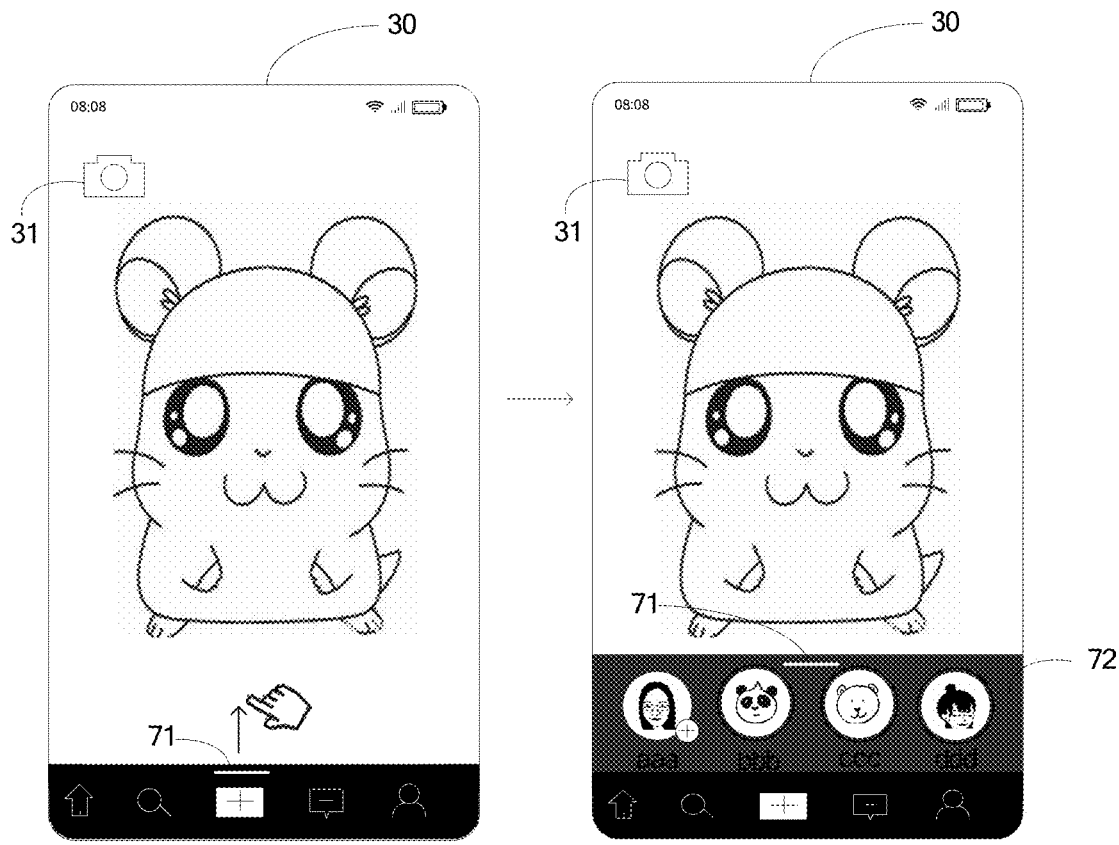
FIG. 7 is a schematic diagram of another user page in an embodiment of the disclosure.

As yet another possible implementation, the first identification may be the first identification 71 as shown in FIG. 7. For example, in the case that user A and/or other users associated with user A have updated and released multimedia information, the terminal 21 may display the first identification 71 on the first page 30.

S102. detecting a trigger operation for the first identification, displaying user identifications corresponding to the one or more users respectively.

For example, when the terminal 21 detects a trigger operation for the first identification, the terminal 21 may display user identifications corresponding to one or more users who have updated and released multimedia information, respectively. It should be understood that the trigger operation for the first identification may be performed by the user A of the terminal 21, or may be performed on terminal 21 by users, such as, user A's family members or friends, who wish to view the first multimedia information on terminal 21.

In some embodiments, detecting a trigger operation for the first identification, displaying user identifications corresponding to the one or more users respectively comprises: detecting a trigger operation for the first identification, displaying user identifications corresponding to the one or more users respectively within a preset area of a first page.

For example, when the terminal 21 detects a trigger operation for the first identification, the terminal 21 may display within the preset area of the first page 30 user identifications corresponding to one or more users who have updated and released multimedia information respectively.

For example, the associated users of user A include not only user B and user C, but also user D. In the case that user A, user B, user C, and user D update and release multimedia information respectively, taking FIG. 5 as an example, if the first identification is the first identification 51 as shown in FIG. 5, when the terminal 21 detects a trigger operation for the first identification 51, the terminal 21 may display the user identification 53, the user identification 54, the user identification 55, and the user identification 56 corresponding to the user A, the user B, the user C, and the user D within the preset area 52 of the first page 30. In addition, user names corresponding to user A, user B, user C, and user D may also be displayed within the preset area 52, for example, the user name of user A is aaa, and so on, and thus will not be repeated here.

If the first identification is the first identification 61 as shown in FIG. 6, when the terminal 21 detects a trigger operation for the first identification 61, the terminal 21 may display user identifications corresponding to the user A, user B, user C, and user D respectively within the preset area 62 of the first page 30, as shown in FIG. 6. In addition, in some embodiments, the user identification corresponding to user A may also be different from user identifications of other users. For example, the user identification of user A displayed within the preset area 62 includes one small sub-identification 63. In addition, in some embodiments, the preset area 62 may include a mask area superimposed on the first page 30. In addition, in some embodiments, it is also possible to display the preset area 62 in the upper region of the first page 30 by moving the video screen currently being played on the first page 30 downward.

In addition, if the first identification is the first identification 71 as shown in FIG. 7, when the terminal 21 detects a trigger operation for the first identification 71, the terminal 21 may display user identifications corresponding to the user A, user B, user C, and user D respectively within the preset area 72 of the first page 30, as shown in FIG. 7. For example, the trigger operation for the first identification 71 may be to slide the first identification 71 upward.

In some embodiments, after the user identifications corresponding to the one or more users respectively are displayed within the preset area of the first page, the method further comprises: detecting a trigger operation for the first page, controlling the user identifications corresponding to the one or more users respectively to disappear from the preset area of the first page, and display the number of the first multimedia information and/or the number of users on the first page.

Figure 8:
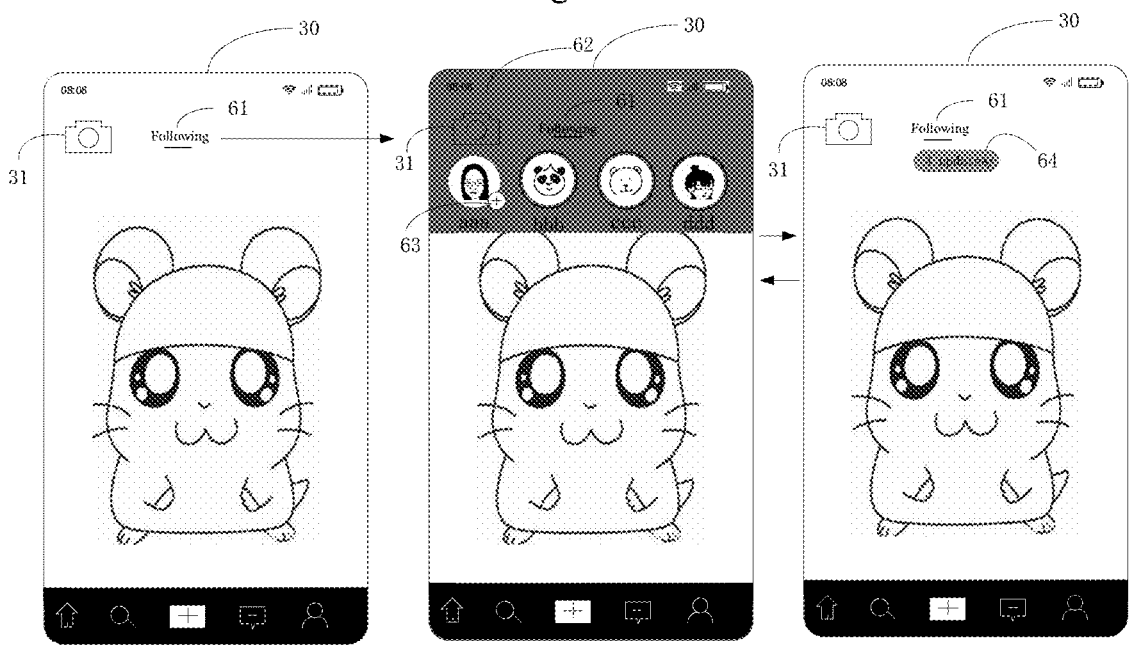
FIG. 8 is a schematic diagram of another user page in an embodiment of the disclosure.

For example, on the basis of FIG. 6, when the terminal 21 detects a trigger operation for the first page 30, the terminal 21 may also control the user identifications corresponding to the user A, the user B, the user C, and the user D respectively to disappear from the preset area 62, and display on the first page 30 the total number of updated and released multimedia information by user A, user B, user C, and user D and/or the number of users that have updated and released multimedia information. As shown in FIG. 8, when the terminal 21 detects a trigger operation (for example, an upward sliding operation) for the first page 30, the terminal 21 may retract the preset area 62 in the first page 30 and display a capsule-shape-like icon 64, in which the number of users that have updated and released multimedia information can be displayed. For example, there are currently 4 users that have updated and released multimedia information, and accordingly, "4 updates" are displayed in the icon 64. In addition, the terminal 21 may also redisplay the preset area 62 in the first page 30, and display user identifications corresponding to the user A, the user B, the user C, and the user D respectively in the preset area 62 when a trigger operation for the icon 64 is detected.

S103: detecting a trigger operation for a user identification of a target user among the one or more users, displaying the first multimedia information that has been updated and released by the target user.

For example, taking any of the FIGS. 5 to 8 as an example, in the case that user identifications corresponding to user A, user B, user C, and user D respectively are displayed on the first page 30, when detecting a trigger operation for the user identification of the target user among user A, user B, user C, and user D, the terminal 21 can display the multimedia information that the target user has updated and released. For example, taking FIG. 5 as an example, in the case that user A clicks on the user identification 53, the terminal 21 can display the recently updated and released multimedia information by user A in the display component based on the click operation for the user identification 53, that is, user A can see the multimedia information updated and released recently by himself. In the case that user A clicks on the user identification 54, the terminal 21 can display the recently updated and released multimedia information by the user B in the display component based on the click operation for the user identification 54, that is, the user A can see the multimedia information recently updated and released by his associated user (for example, user B that he follows.)

The method for multimedia information processing provided by the embodiments of the present disclosure enables users to discover in time that themselves and/or their associated users have updated and released first multimedia information by displaying on a first page a first identification used to identify that one or more users have updated and released the first multimedia information. Further, when a trigger operation for the first identification is detected, user identifications corresponding to one or more users who have updated and released the first multimedia information respectively are displayed. When a trigger operation for a user identification of a target user among one or more users is detected, first multimedia information that the target user has updated and released is displayed, so that the user can see in time and easily the first multimedia information that the user himself and/or his associated users have been updated and released, thereby improving the user experience.

Figure 9:
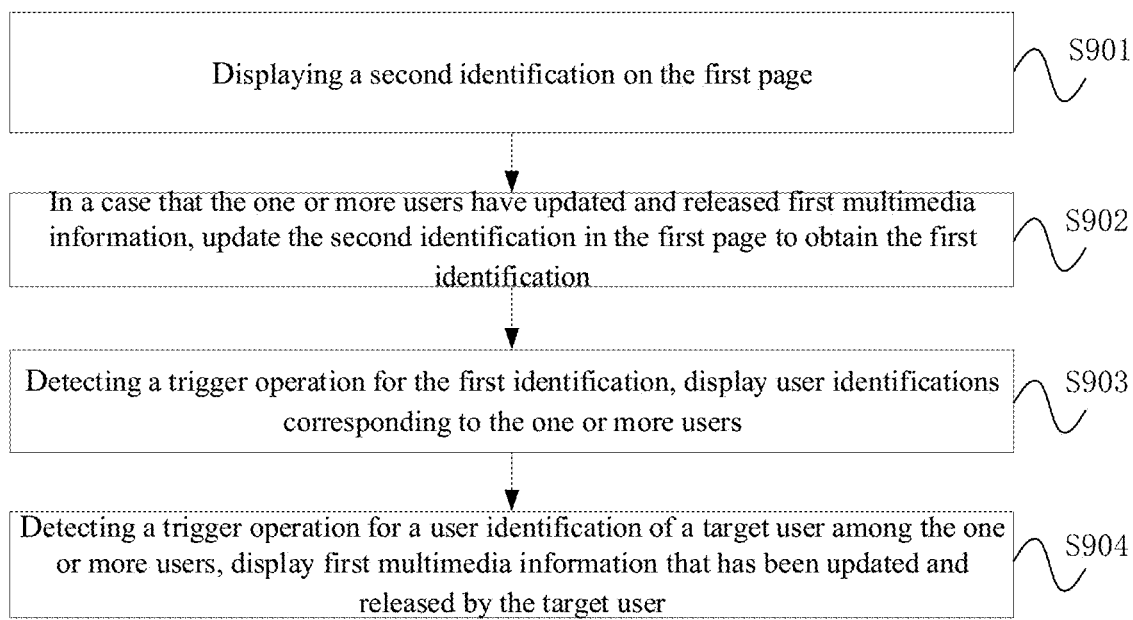
FIG. 9 is a flowchart of another method for multimedia information processing in an embodiment of the disclosure.

FIG. 9 is a flowchart of a method for multimedia information processing in another embodiment of the present disclosure, as shown in FIG. 9, the method comprises following steps:

S901. displaying a second identification on the first page.

Figure 10:
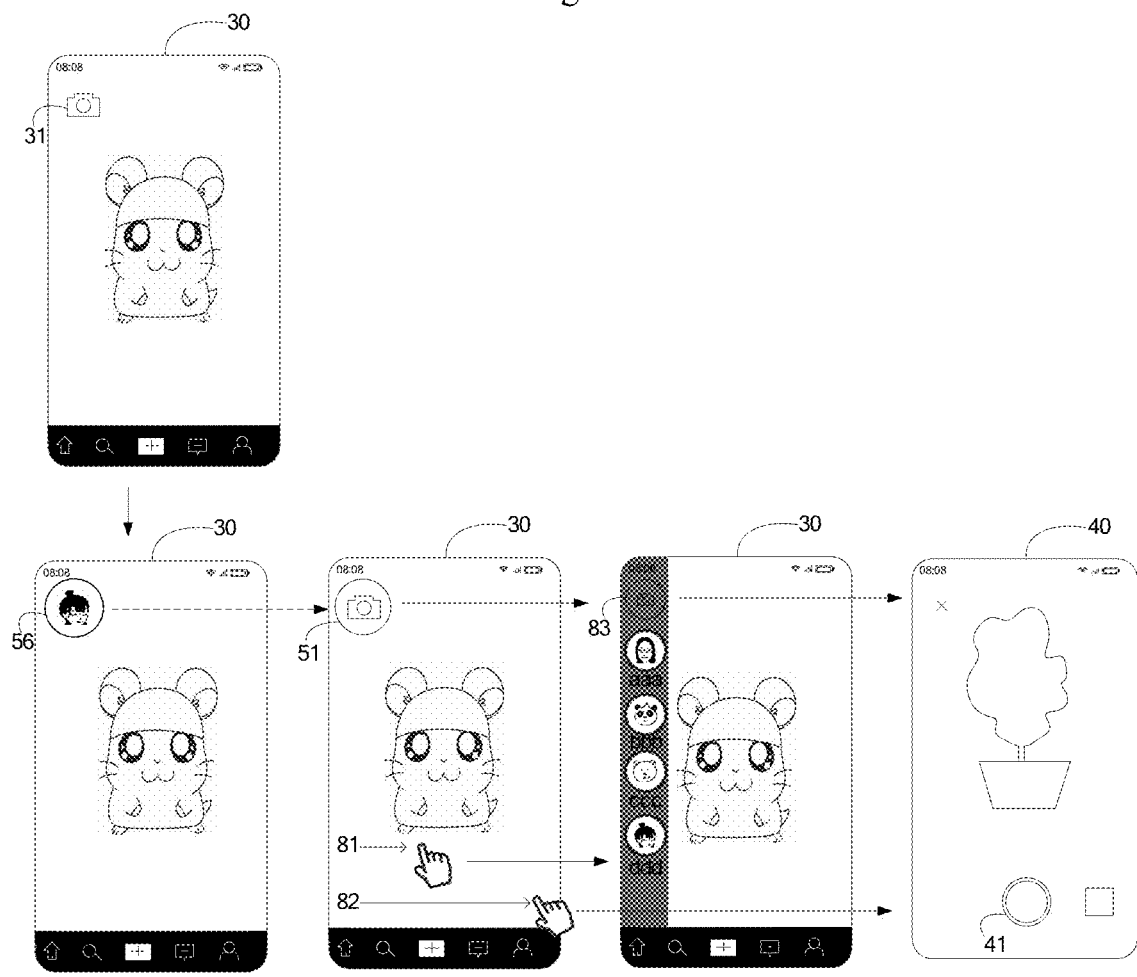
FIG. 10 is a schematic diagram of another user page in an embodiment of the disclosure.

As shown in FIG. 10, a camera identification 31 is displayed on the first page 30, and the camera identification 31 can be donated as a second identification.

S902: In a case that the one or more users have updated and released first multimedia information, update the second identification in the first page to obtain the first identification.

For example, user A is donated as the first user, user A's associated users, such as user B, user C, and user D, are donated as the second users, in the case that user A and/or at least one associated user of user A has updated and released first multimedia information, the terminal 21 may update the camera identification 31 in the first page 30 to obtain the first identification 51 as described above.

In one possible implementation, updating the second identification in the first page to obtain the first identification comprises: adding a third identification for the second identification, the second identification and the third identification constituting the first identification.

For example, as shown in FIG. 5, in the case that user A and/or at least one associated user of user A has updated and released first multimedia information, a third identification can be directly added to the camera identification 31, this embodiment is not intend to limit the third multimedia identification specifically, for example, the third identification may be a circle as shown in FIG. 5. In other embodiments, the third identification can also be other identification that can cause the camera identification 31 to change, for example, a small dot can be added to the camera identification 31, or the number of the first multimedia information that have updated and released and/or the number of users that have updated and released the first multimedia information, etc., can be added to the camera identification 31. As shown in FIG. 5, the camera identification 31 and the circle constitute the first identification 51.

In another possible implementation, updating the second identification in the first page to obtain the first identification comprises: displaying a user identification corresponding to at least one user that has updated and released first multimedia information at the corresponding position of the second identification, the user identification including a third identification and image information, and the third identification including edge portion of the user identification; after a preset time, controlling the image information in the user identification at the corresponding position to disappear and to be replaced by the second identification, and keep the third identification in the user identification at the corresponding position, wherein the second identification and the third identification constitute the first identification.

For example, as shown in FIG. 10, in the case that user A and/or at least one associated user of user A has updated and released first multimedia information, a user identification corresponding to at least one user that has updated and released the first multimedia information may be displayed in corresponding position of the camera identification 31. For example, the user D has updated and released first multimedia information, and further, the user identification 56 corresponding to the user D is displayed in corresponding position of the camera identification 31. Specifically, the camera identification 31 may be overlaid by the user identification 56. Specifically, the user identification 56 may include a third identification and image information, wherein the third identification may be edge portion of the user identification 56, such as a circle. The image information may specifically be a user avatar of the user D, and the user avatar may be an image of the user D himself, or an image set by the user D that is not himself. It should be understood that, in a case that multiple users have updated and released first multimedia information, the corresponding position of the camera identification 31 may alternately display user identifications of the multiple users, or display user identifications of the multiple users at the same time (for example, user identifications of the multiple users are displayed in a superimposed manner). In addition, one or more user identifications displayed on corresponding position of the camera identification 31 may be continuously displayed, or may be displayed for a preset period of time. For example, taking the user identification 56 corresponding to the user D as an example, the user identification 56 may be continuously displayed at corresponding position of the camera identification 31, or may be displayed at corresponding position of the camera identification 31 for a preset period of time. In addition, the display manner of the user identification 56 is not limited within the preset time, for example, it may be displayed intermittently or continuously. After the preset time, for example, after 3 seconds, the user avatar in the user identification 56 at corresponding position of the camera identification 31 is controlled to disappear, to be replaced by the camera identification 31, and keep the third identification of the user identification 56 at the corresponding position, such as the circle. As a result, the camera identification 31 and the circle constitute the first identification 51, thereby representing that there is a user that has updated and released first multimedia information.

In some other embodiments, the third identification such as the circle described above may have at least one color. In the case of multiple colors, each color may correspond to a small arc of the circle. The colors of the third identifications corresponding to different user identifications may be different or the same. In one embodiment, the color of the third identification may include the iconic color of the corresponding application, so as to further improve the third identification and aesthetics and recognition of the third identification on the first page.

In some embodiments, the method may further comprise: detecting a first sliding operation for the first page, displaying user identifications corresponding to the one or more users respectively; or detecting a second sliding operation for the first page, displaying a second page, and the second page is used to shoot second multimedia information; wherein the sliding distance corresponding to the second sliding operation is greater than the sliding distance corresponding to the first sliding operation.

As shown in FIG. 10, in the case that the first identification 51 appears, the terminal 21 may display user identifications corresponding to one or more users respectively that have updated and released first multimedia information when detecting a first sliding operation for the first page 30. For example, user A, user B, user C, and user D have respectively updated and released first multimedia information, then the terminal 21 can display user identifications corresponding to user A, user B, user C, and user D respectively in a preset area (for example, the left area) of the first page 30 when detecting a first sliding operation for the first page 30. The first sliding operation may be a sliding operation as shown by arrow 81 shown in FIG. 10. Alternatively, the terminal 21 may display a second page when detecting a second sliding operation for the first page 30. The second page may be the second page 40 as shown in FIG. 10, and the second page 40 includes a shooting button 41. When the terminal 21 detects a trigger operation for the shooting button 41, the terminal 21 may control the shooting component to shoot objects within the shooting range, so as to obtain the second multimedia information by shooting. The second sliding operation may be a sliding operation as shown by arrow 82 shown in FIG. 10. It can be seen from FIG. 10 that the sliding distance corresponding to the second sliding operation is greater than the sliding distance corresponding to the first sliding operation. That is, sliding operations with different sliding distances can trigger display of different pages. For example, the distance of sliding to the right by a first sliding operation may be less than a preset distance, and the distance of sliding to the right by a second sliding operation may be greater than or equal to the preset distance, and the preset distance may be one third of the screen width.

In some embodiments, displaying user identifications corresponding to the one or more users respectively comprises: vertically displaying user identifications corresponding to the one or more users respectively within a preset area of the first page along the direction of the first sliding operation.

As shown in FIG. 10, when the user A performs a first sliding operation in the direction shown by the arrow 81, the terminal 21 may display user identifications corresponding to user A, user B, user C, and user D respectively vertically within the preset area of the first page 30 along the direction of the first sliding operation.

In some embodiments, the method further comprises: increasing the display area of the second page along the direction of the second sliding operation; when the second slide operation reaches the edge of the display component or a release instruction for the second slide operation is received, displaying the second page in full screen in the display component for shooting the second multimedia information.

Figure 11:
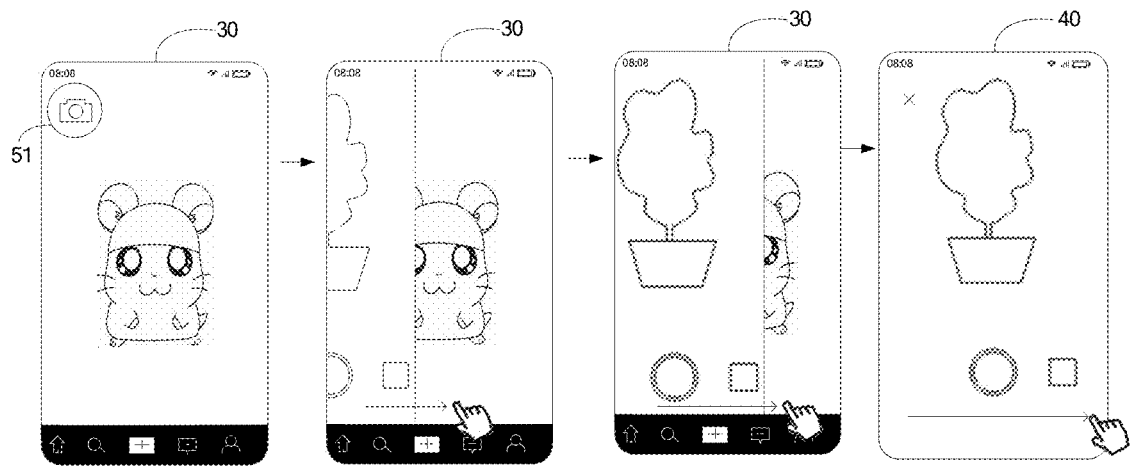
FIG. 11 is a schematic diagram of another user page in an embodiment of the disclosure.

For example, the process of switching from the first page 30 to the second page 40 according to the second sliding operation shown in FIG. 10 can be refined into the process shown in FIG. 11. For example, the terminal 21 may gradually increase the display area of the second page along the direction of the second sliding operation, that is, the larger the sliding distance of the second sliding operation, the larger the display area of the second page (as shown by the dividing line between the first page and the second page shown by the dotted line in FIG. 11; those skilled in the art should understand that in an actual page, there is no dotted line between the first page and the second page, which is illustrated here only for ease of understanding.) When the second sliding operation reaches the edge of the display component or the terminal 21 detects that user A has stopped sliding, that is, received a release instruction for the second sliding operation, a second page is displayed in full screen on the screen, thereby facilitating user A to shoot second multimedia information through the second page.

Figure 12:
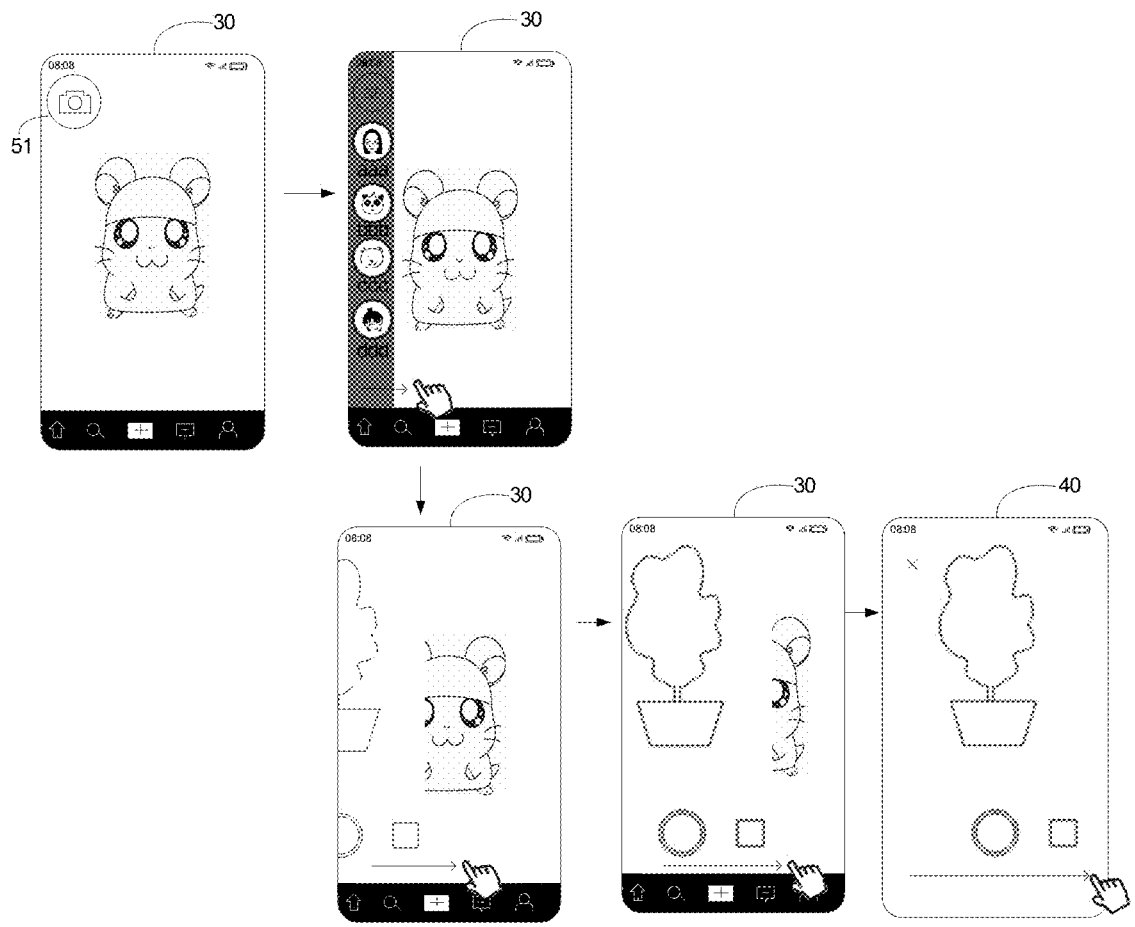
FIG. 12 is a schematic diagram of another user page in an embodiment of the disclosure.

In addition, in some other embodiments, the same continuous sliding operation can also trigger the terminal 21 to gradually change displayed content. For example, as shown in FIG. 12, when the sliding distance of the sliding operation is less than one third of the screen width, the terminal 21 display user identifications corresponding to the user A, the user B, the user C, and the user D respectively on the first page 30. As the sliding operation continues, when the sliding distance of the sliding operation is equal to one third of the screen width, the terminal 21 displays part of the second page in the first page 30, and as the sliding distance further increases, the display area of the second page also increases further, until the sliding operation reaches the edge of the display component or the terminal 21 detects that the user A has stopped sliding, the second page 40 is displayed in full screen on the screen.

S903. detecting a trigger operation for the first identification, display user identifications corresponding to the one or more users.

As shown in FIG. 10, the terminal 21 may also display user identifications corresponding to the user A, the user B, the user C, and the user D when detecting a trigger operation for the first identification 51. That is, user identifications corresponding to the user A, the user B, the user C, and the user D are displayed on the first page 30, which can be triggered by various different triggering operations.

In some embodiments, detecting a trigger operation for the first identification, displaying user identifications corresponding to the one or more users respectively comprises: detecting a trigger operation for the first identification, displaying shooting identification and user identifications corresponding to the one or more users respectively within a preset area of the first page.

As shown in FIG. 10, when the terminal 21 detects a trigger operation for the first identification 51, the shooting identification 83, and user identifications corresponding the user A, the user B, the user C, and the user D respectively may be displayed in the preset area of the first page 30. The color of the shooting identification 83 can be determined according to the color of the circle of the first identification 51. For example, the circle of the first identification 51 is composed of a red arc and a blue arc, and the filling color inside the shooting identification 83 may include red and blue. In one embodiment, accordingly, the color of the shooting identification may include the iconic color of the corresponding application, so as to further improve the shooting identification and aesthetics and recognition of the shooting identification on the first page.

In some embodiments, after displaying the shooting identification and user identifications corresponding to the one or more users within the preset area of the first page, the method further comprises: detecting a trigger operation for the shooting identification, displaying a second page, which is used to shoot second multimedia information.

For example, as shown in FIG. 10, after displaying the shooting identification 83 and user identifications corresponding to the user A, the user B, the user C, and the user D respectively in the preset area of the first page 30, the terminal 21 may also display the second page 40 when detect a trigger operation for the shooting identification 83, so that the user A can shoot second multimedia information through the second page 40. Wherein, the trigger operation for the shooting identification 83 may include clicking on the shooting identification 83.

S904: detecting a trigger operation for a user identification of a target user among the one or more users, display first multimedia information that has been updated and released by the target user.

For example, as shown in FIG. 10, after displaying the shooting identification 83 and the user identifications corresponding to the user A, the user B, the user C, and the user D within a preset area of the first page 30, and when detecting a trigger operation for a user identification of a target user among the user A, the user B, the user C, the user D, the terminal 21 may display first multimedia information that has been updated and released by the target user.

In some embodiments, detecting a trigger operation for a user identification of a target user among the one or more users, displaying first multimedia information that has been updated and released by the target user comprises: detecting a trigger operation for a user identification of a target user among the one or more users, displaying a third page, and the third page including first multimedia information that has been updated and released by the target user, and one or more fourth identifications, the number of which is used to identify the number of first multimedia information that the target user has updated and released.

Figure 13:
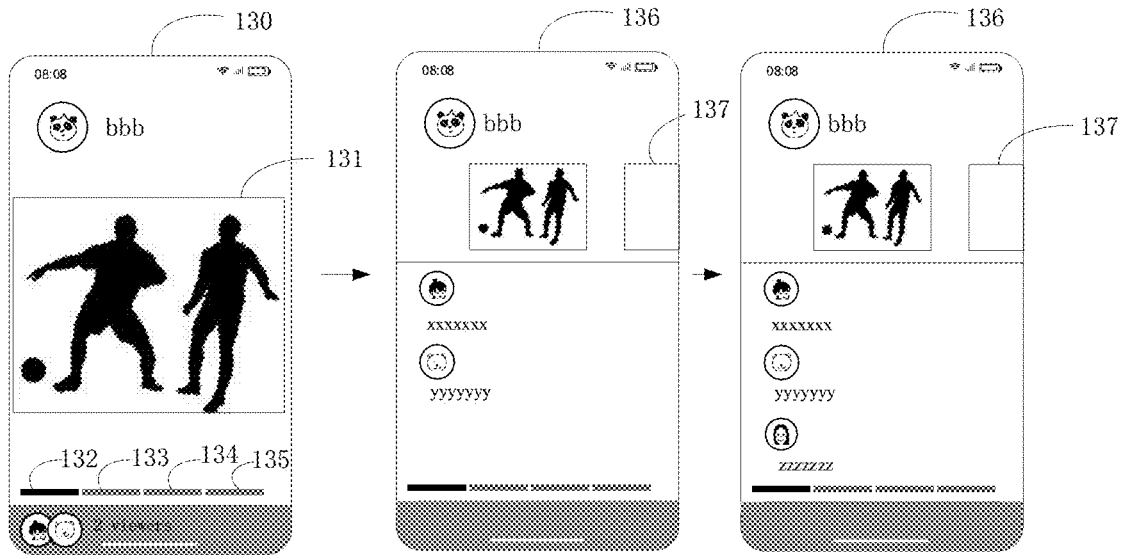
FIG. 13 is a schematic diagram of another user page in an embodiment of the disclosure.

For example, as shown in FIG. 10, after displaying the shooting identification 83 and user identifications corresponding to the user A, the user B, the user C, and the user D respectively in a preset area of the first page 30, the terminal 21 detects a trigger operation for the user identification of the user B, and at this case, user B is the target user. Further, the terminal 21 may display a third page on the screen, and the third page may specifically be 130 as shown in FIG. 13. Specifically, the third page 130 includes multimedia information 131 that user B has updated and released, and one or more fourth identifications, the number of which is used to identify the number of multimedia information that user B has updated and released. For example, user B has updated and released 4 multimedia information, and 4 fourth identifications may be displayed on the third page 130, for example, the fourth identification 132—the fourth identification 135. Wherein, the multimedia information 131 may correspond to the fourth identification 132. In the process of playing the multimedia information 131, or in the case of finishing playing the multimedia information 131, display effect of the fourth identification 132 can be adjusted so that display effect of the fourth identification 132 is different from display effects of the other three fourth identifications, thereby indicating that user A is viewing or has finished viewing the first multimedia information among 4 multimedia information that have been updated and released by user B. For example, the color or brightness of the fourth identification 132 is different from the colors or brightness of the other three fourth identifications. In some embodiments, if the multimedia information 131 is video information or other dynamically displayed information, then during the playback of the multimedia information 131, the adjustment progress of the color or brightness of the fourth identification 132 may be positive correlated with the playback progress of the multimedia information 131. That is, the proportion of the portion of adjusted color or brightness of the fourth identification 132 in the fourth identification 132 can be used to identify the playback progress of the multimedia information 131.

In addition, as shown in FIG. 13, the third page 130 may also display identifications of users who have watched the multimedia information 131 and/or a number of users who have watched the multimedia information 131. When the terminal 21 detects a trigger operation for identifications or the number, the terminal 21 may also display a fourth page 136 as shown in FIG. 13. In the fourth page 136, the multimedia information 131 is reduced to play, and in the fourth page 136, a partial cover 137 or all cover of the next multimedia information of the multimedia information 131 can also be displayed. In addition, the content of evaluation from individual users towards the multimedia information 131 can be fully displayed on the fourth page 136. For example, "xxxxxxx" and "yyyyyyy" are respectively the content of evaluation from different users towards the multimedia information 131. It should be understood that viewing users and evaluation contents corresponding to different multimedia information updated and released by the same user may be different. Further, if user A also wants to evaluate the multimedia information 131, the terminal 21 may display the user identification of the user A and the evaluation content of the user A, such as "zzzzzzz", in the fourth page 136, according to the evaluation operation of the user A.

In addition, it can be understood that the target user as described above may also be a user A of the terminal 21. In this case, the terminal 21 detects a trigger operation for the user identification of the user A, and the user A can view multimedia information that he has updated and released through the third page 130. Similar to FIG. 13 as described above, the third page 130 can display user identifications of other users that have watched the multimedia information updated and released by user A, and user A can also interact with other users through a fourth page similar to the that described above.

According to the method for multimedia information processing provided by the embodiments of the present disclosure, in a case that one or more users do not update and release first multimedia information, a second identification is displayed on a first page, and through the second identification, it can enter a shooting page, so that users can shoot new multimedia information for releasing. In addition, in the case that one or more users have updated and released first multimedia information, the first identification is obtained by updating the existing second identification in the first page. Thus, to enable the first identification and the second identification to represent different situations respectively, and enable the first identification and the second identification to reuse the same position in the first page, which not only improves the page utilization of the first page, but also allows users to discover in time that himself and/or his own associated users have updated and released the first multimedia information by the second identification transforming into the first identification, thereby improving user experience. In addition, in this embodiment, when detecting a first sliding operation for a first page, display user identifications corresponding to one or more users respectively; or when detecting a second sliding operation for the first page, display a second page. Thus, enable sliding operations with different sliding distances to trigger the display of different pages, which improves flexibility of page display. At the same time, the user can also determine the content displayed in the display component according to the sliding distance, which further improves the user experience.

On the basis of foregoing embodiments, after the third page is displayed, the method further comprises: detecting a third sliding operation for the third page, switching playing the first multimedia information updated and released by the target user in the third page; or detecting a fourth sliding operation for the third page, switching playing the first multimedia information updated and released by different users in the third page. In some embodiments, the sliding direction corresponding to the third sliding operation is different from the sliding direction corresponding to the fourth sliding operation.

Figure 14:
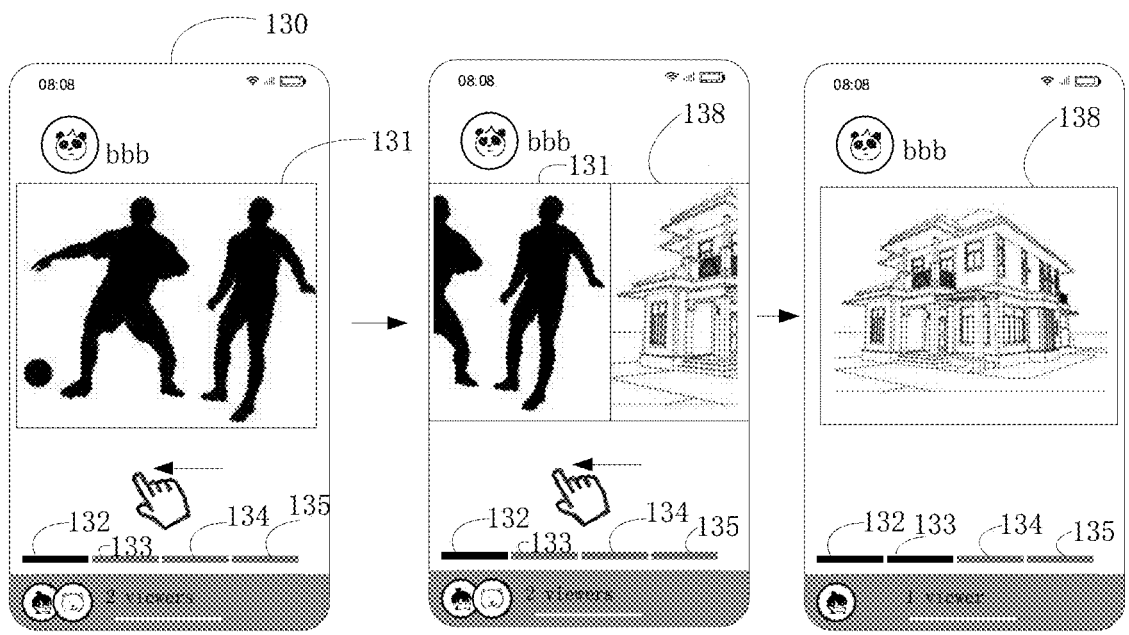
FIG. 14 is a schematic diagram of another user page in an embodiment of the disclosure.

As shown in FIG. 14, the multimedia information 131 displayed on the third page 130 is the multimedia information updated and released by the target user, such as user B (for example, the current time is donated as T1, and the user of the terminal 21 views multimedia information updated and released by user B through the third page 130 at the current time T1. Assuming that the historical time T2 is prior to the current time, the time when the user of terminal 21 last viewed the multimedia information updated and released by user B, then the multimedia information updated and released by user B, which is viewed by the user of the terminal 21 at current time T1, may be updated and released by user B during the period from T2 to T1. Alternatively, the multimedia information updated and released by user B may be the multimedia information released to the server through the terminal 22 within a preset time period. If the user of the terminal 21 has not viewed the multimedia information updated and released by the user B within the preset time period, then in the next preset time period, the user of the terminal 21 can view the multimedia information updated and released by user B within the next preset time period). After the terminal 21 displays the third page 130, the terminal 21 may also switch playing other multimedia information updated and released by the target user on the third page 130 when detecting a third sliding operation for the third page 130. That is, the third sliding operation can trigger the terminal 21 to switch playing different multimedia information updated and released by the same user in the third page 130. As shown in FIG. 14, the third sliding operation may specifically be a horizontal sliding operation. When the terminal 21 detects a horizontal sliding operation for the third page 130, it gradually switches from playing multimedia information 131 to playing multimedia information 138, and the multimedia information 138 may be the next multimedia information of the multimedia information 131, and the multimedia information 131 and the multimedia information 138 are both updated and released by a target user, such as user B.

In some embodiments, after switching playing the first multimedia information updated and released by the target user on the third page, the method further comprises: adjusting the display effect of the fourth identification according to the number of the first multimedia information updated and released by the target user that has been played.

For example, when the multimedia information 138 is played in full screen on the screen, or when the multimedia information 138 is finished playing, or when the terminal 21 switches to play the next multimedia information of the multimedia information 138 according to a third sliding operation during playing of the multimedia information 138, the terminal 21 can further adjust the color or brightness of the fourth identification 133 corresponding to the multimedia information 138, thereby indicating that user A is viewing or has already viewed the second multimedia information of 4 multimedia information that user B has updated and released. After the 4 multimedia information that user B has updated and released are all played by the terminal 21, if the terminal 21 detects the third sliding operation again, the terminal 21 can make corresponding prompts, such as prompting user B that the 4 multimedia information that have been updated and released were all played; or the terminal 21 can stop playing; or the terminal 21 can play the first multimedia information of the 4 multimedia information, so that the 4 multimedia information that have been updated and released by the user B constitute a loop playing mode.

Figure 15:
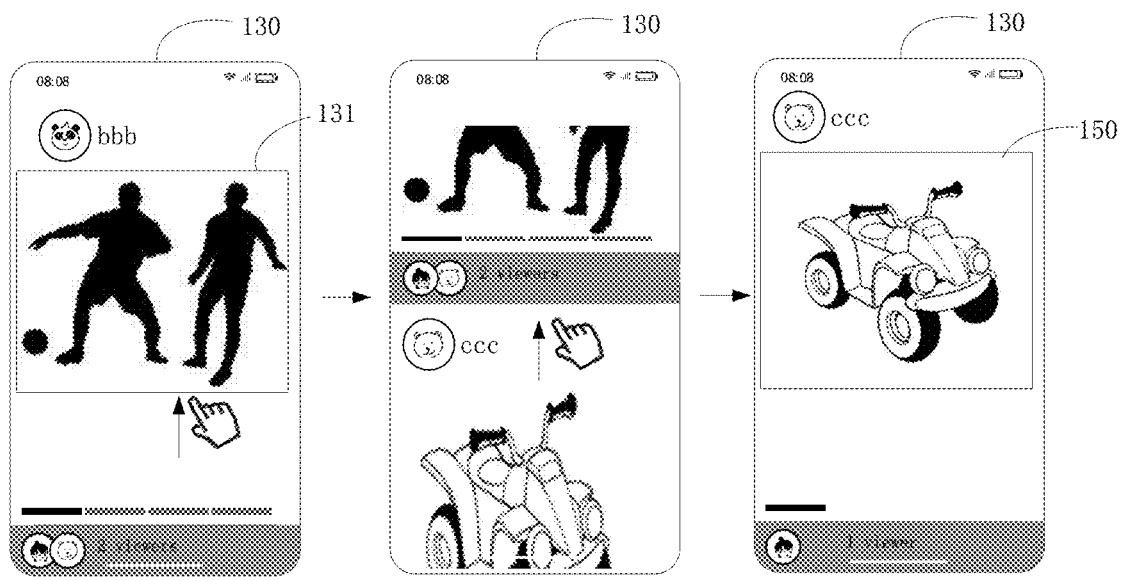
FIG. 15 is a schematic diagram of another user page in an embodiment of the disclosure.

In some embodiments, as shown in FIG. 15, the multimedia information 131 displayed in the third page 130 is the multimedia information updated and released by a target user, such as user B. After the terminal 21 displays the third page 130, the terminal 21 may also switch playing different multimedia information updated and released by different users on the third page 130 when detecting a fourth sliding operation for the third page 130. That is, the fourth sliding operation can trigger the terminal 21 to switch playing different multimedia information updated and released by different users in the third page 130. As shown in FIG. 15, the fourth sliding operation may specifically be a vertical sliding operation, such as an upward sliding operation. When the terminal 21 detects an upward sliding operation for the third page 130, it gradually switches from playing the multimedia information 131 of user B to playing the multimedia information 150 of user C. As shown in FIG. 10, user identifications corresponding to user A, user B, user C, and user D are displayed vertically within a preset area of the first page 30. Therefore, the switching sequence of multimedia information between different users triggered by the fourth sliding operation may be consistent with the order sequence of the user identifications of the different users in the preset area. For example, the first page 30 is currently playing the multimedia information updated and released by the user B, and when sliding upward is made on the first page 30, it switches to playing the multimedia information updated and released by the user C. Alternatively, the first page 30 is currently playing the multimedia information updated and released by the user B, and when sliding downward is made on the first page 30, it switches to playing the multimedia information updated and released by the user A. Therefore, the sliding effect of the fourth sliding operation is consistent with the visual effect of the ordered individual user identifications.

As shown in FIG. 10, the user identification of user A is already the uppermost user identification within the preset area. In some cases, if the first page 30 is currently playing multimedia information updated and released by user A, and the terminal 21 detects a downward sliding operation for the third page 130 again, the terminal 21 can perform a corresponding prompt, such as prompt that there are currently no users that can be switched; or the terminal 21 can stop playing; or the terminal 21 can play the multimedia information updated and released by the user D, so that the multimedia information updated and released by the user A, user B, user C, and user D respectively constitutes a loop playing mode. In the same way, if the first page 30 is currently playing multimedia information updated and released by the user D, and the terminal 21 detects a upward sliding operation for the third page 130 again, the terminal 21 can perform in accordance with aforementioned possible ways, and thus will not be repeated here.

Figure 16:
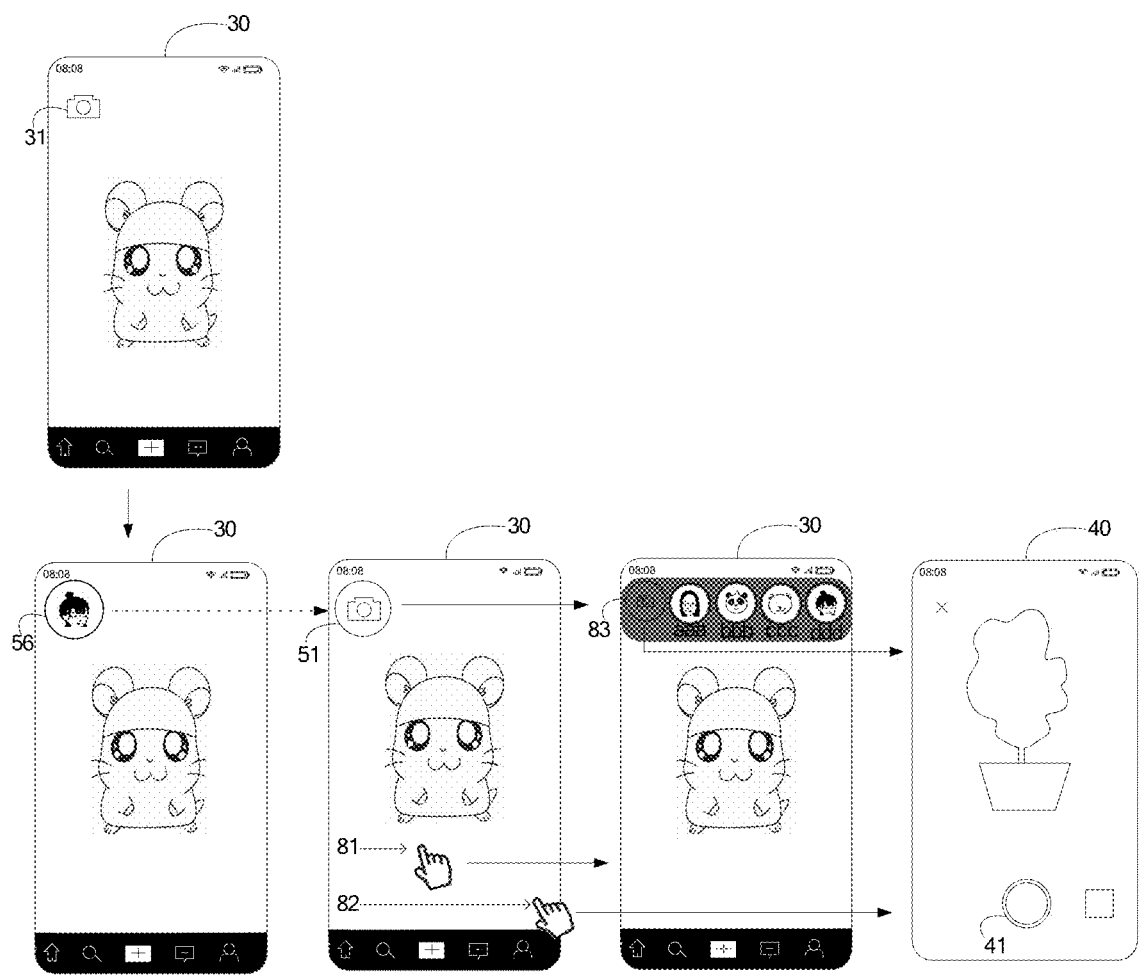
FIG. 16 is a schematic diagram of another user page in an embodiment of the disclosure.

In addition, in some other embodiments, as an alternative of FIG. 10, user identifications corresponding to the user A, the user B, the user C, and the user D respectively may also be displayed horizontally within the preset area of the first page 30, as shown in FIG. 16. In this case, in a case that the terminal 21 detects a trigger operation for a user identification of a target user among the user A, user B, user C, and user D and displays a third page, the terminal 21 may switch playing different multimedia information updated and released by different users when detecting a horizontal sliding operation for the third page. Or switch playing different multimedia information updated and released by the same user when detecting a vertical sliding operation for the third page.

By setting different sliding operation directions, switching displaying multimedia information updated by the same user or different users who updated multimedia information, information display can be provided for users according to different information aggregation methods, which further improves user experience and information exposure. The information here may include, for example, multimedia information, prompt information for prompting one or more users having updated multimedia information, and so on.

In some embodiments, the one or more fourth identifications constitute an edge portion of the user identification corresponding to the target user.

Figure 17:
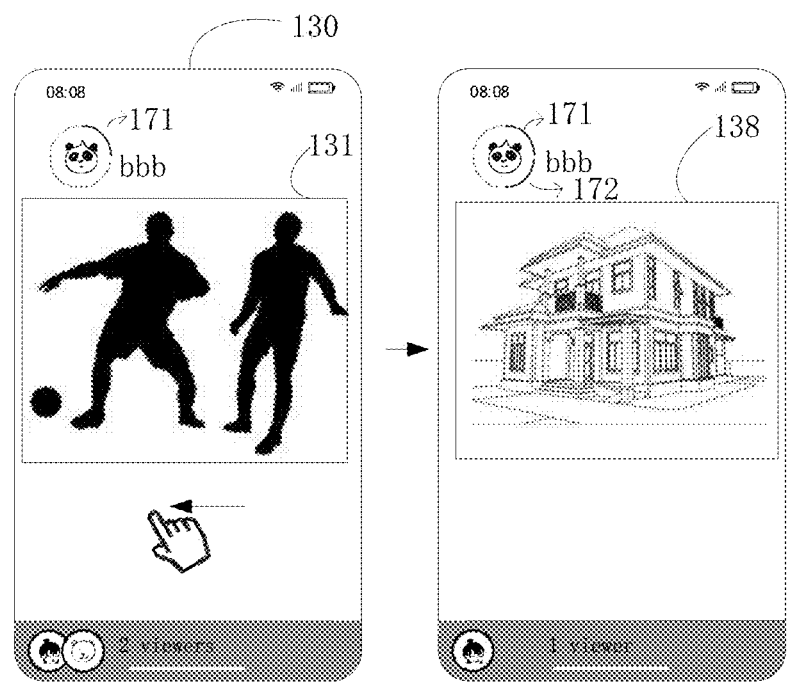
FIG. 17 is a schematic diagram of another user page in an embodiment of the disclosure.

For example, the fourth identification is not limited to the fourth identification 132 to the fourth identification 135 as described above. As an alternative, one or more fourth identifications may constitute an edge portion of the user identification corresponding to the target user, such as user B, as shown in FIG. 17. As shown in FIG. 17, the edge portion of the user identification corresponding to user B includes multiple arcs, and each of the multiple arcs is a fourth identification. The number of arcs identifies the number of multimedia information updated and released by user B. Taking FIG. 17 as an example, user B updates and releases 4 pieces of multimedia information. Accordingly, the edge portion of the user identification corresponding to user B includes 4 arcs. Each of the 4 arcs is a fourth identification. When the first multimedia information 131 of the 4 multimedia information updated and released by the user B is playing or has finished playing, the color or brightness of the first arc 171 of the four arcs changes. When the second multimedia information 138 of the 4 multimedia information updated and released by the user B is playing or has finished playing, the color or brightness of the second arc 172 of the four arcs changes. Similarly, in some embodiments, if the multimedia information 131 is video information or other dynamically displayed information, then during the playback of the multimedia information 131, the adjustment progress of the color or brightness of the first arc 171 may be positive correlated with the playback progress of the multimedia information 131. That is, the proportion of the portion of adjusted color or brightness of the first arc 171 in the first arc 171 can be used to identify the playback progress of the multimedia information 131. The gradual adjustment of the color or brightness of the second arc 172 may be similar to the first arc 171, which will not be repeated here.

It should be understood that the fourth identification described in this embodiment is only a schematic description and is not specifically limited. In other embodiments, there may be other shapes or settings, as long as they can identify the number of the multimedia information updated and released by a certain user, as well as have the ability to distinguish and identify the multimedia information that has been played.

The method for multimedia information processing provided by the embodiments of the present disclosure switches playing first multimedia information updated and released by the same user when detecting a third sliding operation for the third page; or switches playing first multimedia information updated and released by different users when detecting a fourth sliding operation for the third page. Thus, to enable the sliding effect of the sliding operation to be consistent with the visual effect of the ordered individual user identifications, and the user experience is further improved. In addition, by using a fourth identification to identify the number of multimedia information that a certain user has updated and released, as well as by using the fourth identification to distinguish and identify multimedia information that has been played, the viewer can be enabled to clearly determine the number of multimedia information updated and released by the same user, and the multimedia information that has been played, which further improves the user experience.

Figure 18:
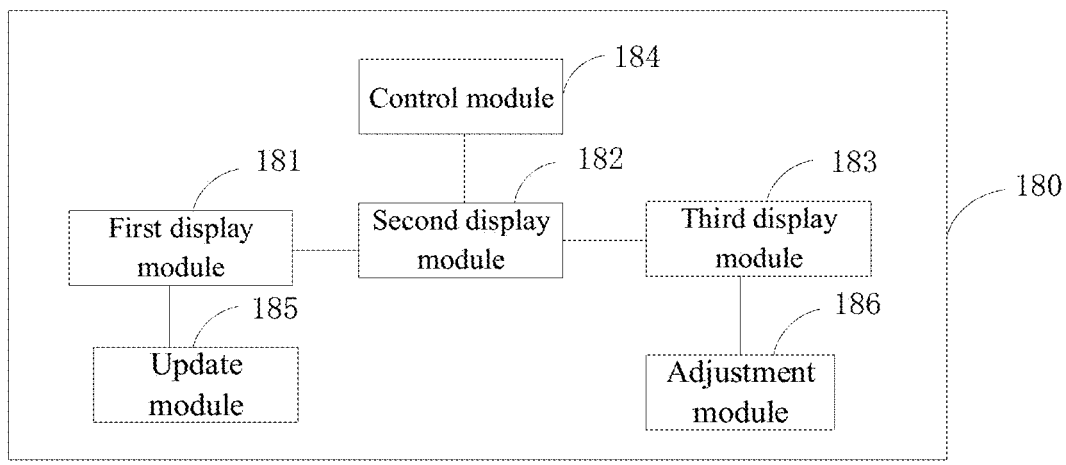
FIG. 18 is a schematic structural diagram of an apparatus for multimedia information processing in an embodiment of the disclosure.

FIG. 18 is a schematic structural diagram of an apparatus for multimedia information processing in an embodiment of the disclosure. The apparatus for multimedia information processing provided by the embodiment of the present disclosure may be configured in a client or may be configured in a server. The apparatus for multimedia information processing 180 specifically comprises:

a first display module 181, used to display a first page, the first page includes a first identification, and the first identification is used to identify that one or more users have updated and released first multimedia information, and the one or more users include a first user and/or one or more second users, and the one or more second users include associated users of the first user;

a second display module 182, used to display user identifications corresponding to the one or more users when detecting a trigger operation for the first identification;

a third display module 183, used to display first multimedia information that a target user has updated and released when detecting a trigger operation for a user identification of the target user among the one or more users.

In some embodiments, the second display module 182 is specifically used to: when detecting a trigger operation for the first identification, display user identifications corresponding to the one or more users respectively within a preset area of the first page.

In some embodiments, the apparatus for multimedia information processing 180 further comprises: a control module 184, used to control the user identifications corresponding to the one or more users respectively to disappear from the preset area of the first page when detecting a trigger operation for the first page, and display the number of the first multimedia information and/or the number of the users on the first page.

In some embodiments, the first display module 181 is specifically used to: display a second identification on the first page; the apparatus for multimedia information processing 180 further comprises: an update module 185, used to obtain the first identification by updating the second identification in the first page in a case that the one or more users have updated and released the first multimedia information.

In some embodiments, the update module 185 is specifically used to: add a third identification for the second identification, the second identification and the third identification constitute the first identification.

In some embodiments, the update module 185 is specifically used to: display a user identification corresponding to at least one user who has updated and released the first multimedia information in a corresponding position of the second identification, and the user identification includes a third identification and image information, and the third identification includes an edge portion of the user identification;

After a preset time, the image information in the user identification at the corresponding position is controlled to disappear, to be replaced by the second identification, and keep the third identification in the user identification at the corresponding position, wherein, the second identification and the third identification constitute the first identification.

In some embodiments, the second display module 182 is further used to: when detecting a first sliding operation for the first page, display user identifications corresponding to the one or more users respectively; or when detecting a second sliding operation for the first page, display a second page, and the second page is used to shoot second multimedia information; wherein, the sliding distance corresponding to the second sliding operation is greater than that corresponding to the first sliding operation.

In some embodiments, the second display module 182 is specifically used to: along the direction of the first sliding operation, vertically display user identifications corresponding to the one or more users respectively within a preset area of the first page.

In some embodiments, the second display module 182 is specifically used to: increase the display area of the second page along the direction of the second sliding operation;

When the second slide operation reaches the edge of the display component or a release instruction for the second slide operation is received, a second page is displayed in full screen in the display component for shooting the second multimedia information.

In some embodiments, the second display module 182 is specifically used to: when detecting a trigger operation for the first identification, display a shooting identification and user identifications corresponding to the one or more users respectively in a preset area of the first page.

In some embodiments, the second display module 182 is further used to: when detecting a trigger operation for the shooting identification, display a second page, and the second page is used to shoot second multimedia information.

In some embodiments, the third display module 183 is specifically used to: when detecting a trigger operation for a user identification of a target user among the one or more users, display a third page, and the third page includes first multimedia information that has been updated and released by the target user, and one or more fourth identifications, the number of which is used to identify the number of first multimedia information that has been updated and released by the target user.

In some embodiments, the third display module 183 is further used to: when detecting a third sliding operation for the third page, switch playing the first multimedia information updated and released by the target user in the third page; or when detecting a fourth sliding operation for the third page, switch playing the first multimedia information updated and released by different users in the third page.

In some embodiments, the sliding direction corresponding to the third sliding operation is different from the sliding direction corresponding to the fourth sliding operation.

In some embodiments, the apparatus for multimedia information processing 180 further comprises: an adjustment module 186, used to adjust the display effect of the fourth identification according to the number of played first multimedia information that has updated and released by the target user.

In some embodiments, the one or more fourth identifications constitute an edge portion of the user identification corresponding to the target user.

The apparatus for multimedia information processing provided by the embodiment of the present disclosure can execute steps executed by the client or the server in the method for multimedia information processing provided by the method embodiments of the present disclosure, and concrete execution steps and beneficial effects will not be repeated here.

Compared with the related art, the technical solution provided by the embodiments of the present disclosure has at least following advantages: the method for multimedia information processing provided by the embodiments of the present disclosure enables users to discover in time that themselves and/or their associated users have updated and released first multimedia information by displaying on a first page a first identification used to identify that one or more users have updated and released the first multimedia information. Further, when a trigger operation for the first identification is detected, user identifications corresponding to one or more users who have updated and released the first multimedia information respectively are displayed. When a trigger operation for a user identification of a target user among one or more users is detected, first multimedia information that the target user has updated and released is displayed, so that the user can see in time and easily the first multimedia information that the user himself and/or his associated users have been updated and released, thereby improving the user experience.

Figure 19:
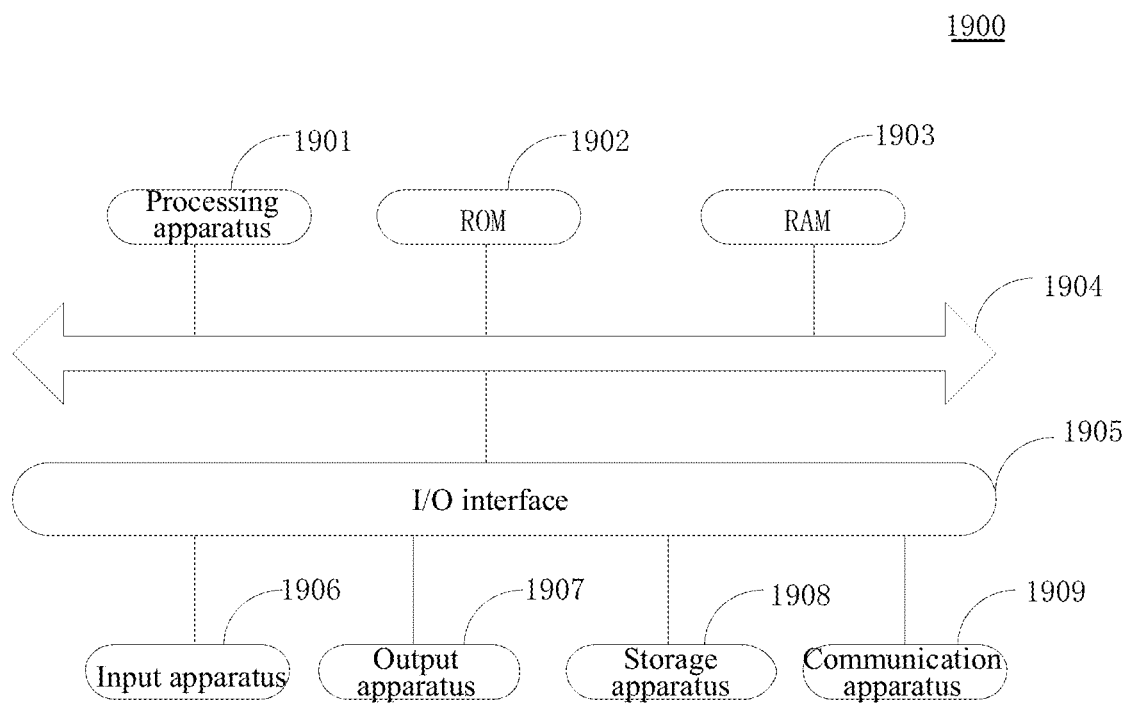
FIG. 19 is a schematic structural diagram of an electronic device in an embodiment of the disclosure.

FIG. 19 is a schematic structural diagram of an electronic device in an embodiment of the disclosure. The following specifically refers to FIG. 19, which shows a schematic structural diagram of an electronic device 1900 suitable for implementing embodiments of the present disclosure. The electronic device 1900 in the embodiments of the present disclosure may include, but is not limited to, mobile phones, notebooks, digital broadcast receivers, PDAs (personal digital assistants), PADs (tablets), PMPs (portable multimedia players), vehicle-mounted terminals (such as vehicle-mounted navigation terminals), mobile terminals such as wearable electronic devices, and fixed terminals such as digital TVs, desktop computers, smart home devices, etc. The electronic device shown in FIG. 19 is only an example, and should not bring any limitation to the functions and usage scope of the embodiments of the present disclosure.

As shown in FIG. 19, the electronic device 1900 may include a processing apparatus (such as a central processing unit, a graphics processor, etc.) 1901, which may execute various appropriate actions and processing according to a program stored in a read-only memory (ROM) 1902 or loaded from a storage 1908 into a random access memory (RAM) 1903, to implement the method for multimedia information processing according to the embodiments described in the present disclosure. In the RAM 1903, there is also stored various programs and data necessary for the operation of the electronic device 1900. The processing apparatus 1901, the ROM 1902, and the RAM 1903 are connected to each other through a bus 1904. An input/output (I/O) interface 1905 is also connected to the bus 1904.

Generally, the following apparatus can be connected to the I/O interface 1905: including input apparatus 1906 such as touch screen, touch pad, keyboard, mouse, camera, microphone, accelerometer, gyroscope, etc.; output apparatus 1907 such as liquid crystal display (LCD), speakers, vibrator, etc.; a storage 1908 such as a magnetic tape, a hard disk, etc.; and a communication device 1909. The communication device 1909 may allow the electronic device 1900 to perform wireless or wired communication with other devices to exchange data. Although FIG. 19 shows an electronic device 1900 having various apparatus, it should be understood that it is not required to implement or have all of the illustrated apparatus. It may alternatively be implemented or provided with more or fewer apparatus.

In particular, according to an embodiment of the present disclosure, the process described above with reference to the flowchart can be implemented as a computer software program. For example, an embodiment of the present disclosure include a computer program product, which includes a computer program carried on a non-transitory computer-readable medium, and the computer program includes program code for executing the method shown in the flowchart, thereby realizing the method for multimedia information processing as described above. In such an embodiment, the computer program may be downloaded and installed from the network through the communication apparatus 1909, or installed from the storage 1908, or installed from the ROM 1902. When the computer program is executed by the processing apparatus 1901, above-mentioned functions defined in the methods of embodiments of the present disclosure are executed.

It should be noted that the aforementioned computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP (Hyper Text Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The aforementioned computer-readable medium may be included in aforementioned electronic devices; or it may exist alone without being assembled into the electronic device.

The aforementioned computer-readable medium carries one or more programs, which, when executed by the electronic device, cause the electronic device:

To display a first page, the first page including a first identification, the first identification is used to identify that one or more users have updated and released first multimedia information, and the one or more users include a first user and/or one or more second users, and the one or more second users include associated users of the first user;

to detect a trigger operation for the first identification, displaying user identifications corresponding to the one or more users respectively;

to detect a trigger operation for a user identification of a target user among the one or more users, displaying the first multimedia information that has been updated and released by the target user.

In some embodiments, when aforementioned one or more programs are executed by the electronic device, the electronic device may also execute other steps described in foregoing embodiments.

The computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware. Wherein, the name of the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides a method for multimedia information processing, comprising:

displaying a first page, the first page includes a first identification, the first identification is used to identify that one or more users have updated and released first multimedia information, and the one or more users include a first user and/or one or more second users, and the one or more second users include associated users of the first user;

detecting a trigger operation for the first identification, displaying user identifications corresponding to the one or more users respectively;

detecting a trigger operation for a user identification of a target user among the one or more users, displaying the first multimedia information that has been updated and released by the target user.

According to one or more embodiments of the present disclosure, in the method for multimedia information processing provided by the present disclosure, detecting a trigger operation for the first identification, displaying user identifications corresponding to the one or more users respectively comprises:

detecting a trigger operation for the first identification, displaying user identifications corresponding to the one or more users respectively within a preset area of a first page.

According to one or more embodiments of the present disclosure, in the method for multimedia information processing provided by the present disclosure, after the user identifications corresponding to the one or more users respectively are displayed within the preset area of the first page, the method further comprises:

detecting a trigger operation for the first page, controlling the user identifications corresponding to the one or more users respectively to disappear from the preset area of the first page, and display the number of the first multimedia information and/or the number of users on the first page.

According to one or more embodiments of the present disclosure, in the method for multimedia information processing provided by the present disclosure, displaying the first page comprises: displaying a second identification on the first page;

in a case that the one or more users have updated and released first multimedia information, update the second identification in the first page to obtain the first identification.

According to one or more embodiments of the present disclosure, in the method for multimedia information processing provided by the present disclosure, updating the second identification in the first page to obtain the first identification comprises:

adding a third identification for the second identification, the second identification and the third identification constituting the first identification.

According to one or more embodiments of the present disclosure, in the method for multimedia information processing provided by the present disclosure, updating the second identification in the first page to obtain the first identification comprises:

displaying a user identification corresponding to at least one user that has updated and released first multimedia information at the corresponding position of the second identification, the user identification including a third identification and image information, and the third identification including edge portion of the user identification;

after a preset time, controlling the image information in the user identification at the corresponding position to disappear and to be replaced by the second identification, and keep the third identification in the user identification at the corresponding position, wherein the second identification and the third identification constitute the first identification.

According to one or more embodiments of the present disclosure, in the method for multimedia information processing provided by the present disclosure, the method further comprises: detecting a first sliding operation for the first page, displaying user identifications corresponding to the one or more users respectively; or detecting a second sliding operation for the first page, displaying a second page, and the second page is used to shoot second multimedia information;

wherein the sliding distance corresponding to the second sliding operation is greater than the sliding distance corresponding to the first sliding operation.

According to one or more embodiments of the present disclosure, in the method for multimedia information processing provided by the present disclosure, displaying user identifications corresponding to the one or more users respectively comprises:

vertically displaying user identifications corresponding to the one or more users respectively within a preset area of the first page along the direction of the first sliding operation.

According to one or more embodiments of the present disclosure, in the method for multimedia information processing provided by the present disclosure, the method further comprises: increasing the display area of the second page along the direction of the second sliding operation;

when the second slide operation reaches the edge of the display component or a release instruction for the second slide operation is received, displaying the second page in full screen in the display component for shooting the second multimedia information.

According to one or more embodiments of the present disclosure, in the method for multimedia information processing provided by the present disclosure, detecting a trigger operation for the first identification, displaying user identifications corresponding to the one or more users respectively comprises:

detecting a trigger operation for the first identification, displaying shooting identification and user identifications corresponding to the one or more users respectively within a preset area of the first page.

According to one or more embodiments of the present disclosure, in the method for multimedia information processing provided by the present disclosure, after displaying the shooting identification and user identifications corresponding to the one or more users within the preset area of the first page, the method further comprises:

detecting a trigger operation for the shooting identification, displaying a second page, which is used to shoot second multimedia information.

According to one or more embodiments of the present disclosure, in the method for multimedia information processing provided by the present disclosure, detecting a trigger operation for a user identification of a target user among the one or more users, displaying first multimedia information that has been updated and released by the target user comprises:

detecting a trigger operation for a user identification of a target user among the one or more users, displaying a third page, and the third page including first multimedia information that has been updated and released by the target user, and one or more fourth identifications, the number of which is used to identify the number of first multimedia information that the target user has updated and released.

According to one or more embodiments of the present disclosure, in the method for multimedia information processing provided in the present disclosure, after the third page is displayed, the method further comprises:

detecting a third sliding operation for the third page, switching playing the first multimedia information updated and released by the target user in the third page; or detecting a fourth sliding operation for the third page, switching playing the first multimedia information updated and released by different users in the third page.

According to one or more embodiments of the present disclosure, in the method for multimedia information processing provided by the present disclosure, the sliding direction corresponding to the third sliding operation is different from the sliding direction corresponding to the fourth sliding operation.

According to one or more embodiments of the present disclosure, in the method for multimedia information processing provided by the present disclosure, after switching playing the first multimedia information updated and released by the target user on the third page, the method further comprises:

adjusting the display effect of the fourth identification according to the number of the first multimedia information updated and released by the target user that has been played.

According to one or more embodiments of the present disclosure, in the method for multimedia information processing provided by the present disclosure, the one or more fourth identifications constitute an edge portion of the user identification corresponding to the target user.

According to one or more embodiments of the present disclosure, the present disclosure provides an apparatus for multimedia information processing, comprising:

a first display module, used to display a first page, the first page includes a first identification, and the first identification is used to identify that one or more users have updated and released first multimedia information, and the one or more users include a first user and/or one or more second users, and the one or more second users include associated users of the first user;

a second display module, used to display user identifications corresponding to the one or more users when detecting a trigger operation for the first identification;

a third display module, used to display first multimedia information that a target user has updated and released when detecting a trigger operation for a user identification of the target user among the one or more users.

According to one or more embodiments of the present disclosure, in the apparatus for multimedia information processing provided by the present disclosure, the second display module is specifically used to: when detecting a trigger operation for the first identification, display users identifications corresponding to the one or more users respectively within a preset area of the first page.

According to one or more embodiments of the present disclosure, in the apparatus for multimedia information processing provided by the present disclosure, the apparatus for multimedia information processing further comprises: a control module, used to control the user identifications corresponding to the one or more users respectively to disappear from the preset area of the first page when detecting a trigger operation for the first page, and display the number of the first multimedia information and/or the number of the users on the first page. According to one or more embodiments of the present disclosure, in the apparatus for multimedia information processing provided by the present disclosure, the first display module is specifically used to: display a second identification on the first page; the apparatus for multimedia information processing further comprises: an update module, used to obtain the first identification by updating the second identification in the first page in a case that the one or more users have updated and released the first multimedia information.

According to one or more embodiments of the present disclosure, in the multimedia information processing apparatus provided by the present disclosure, the update module is specifically used to: add a third identification for the second identification, the second identification and the third identification constitute the first identification.

According to one or more embodiments of the present disclosure, in the apparatus for multimedia information processing provided by the present disclosure, the update module is specifically used to: display a user identification corresponding to at least one user who has updated and released the first multimedia information in a corresponding position of the second identification, and the user identification includes a third identification and image information, and the third identification includes an edge portion of the user identification;

After a preset time, the image information in the user identification at the corresponding position is controlled to disappear, to be replaced by the second identification, and keep the third identification in the user identification at the corresponding position, wherein, the second identification and the third identification constitute the first identification.

According to one or more embodiments of the present disclosure, in the apparatus for multimedia information processing provided by the present disclosure, the second display module is further used to: when detecting a first sliding operation for the first page, display user identifications corresponding to the one or more users respectively; or when detecting a second sliding operation for the first page, display a second page, and the second page is used to shoot second multimedia information; wherein, the sliding distance corresponding to the second sliding operation is greater than that corresponding to the first sliding operation.

According to one or more embodiments of the present disclosure, in the apparatus for multimedia information processing provided by the present disclosure, the second display module is specifically used to: along the direction of the first sliding operation, vertically display user identifications corresponding to the one or more users respectively within a preset area of the first page.

According to one or more embodiments of the present disclosure, in the apparatus for multimedia information processing provided by the present disclosure, the second display module is specifically used to: increase the display area of the second page along the direction of the second sliding operation;

When the second slide operation reaches the edge of the display component or a release instruction for the second slide operation is received, a second page is displayed in full screen in the display component for shooting the second multimedia information.

According to one or more embodiments of the present disclosure, in the apparatus for multimedia information processing provided by the present disclosure, the second display module is specifically used to: when detecting a trigger operation for the first identification, display a shooting identification and user identifications corresponding to the one or more users respectively in a preset area of the first page.

According to one or more embodiments of the present disclosure, in the apparatus for multimedia information processing provided by the present disclosure, the second display module is further used to: when detecting a trigger operation for the shooting identification, display a second page, and the second page is used to shoot second multimedia information. According to one or more embodiments of the present disclosure, in the multimedia information processing apparatus provided by the present disclosure, the third display module is specifically used to: when detecting a trigger operation for a user identification of a target user among the one or more users, display a third page, and the third page includes first multimedia information that has been updated and released by the target user, and one or more fourth identifications, the number of which is used to identify the number of first multimedia information that has been updated and released by the target user.

According to one or more embodiments of the present disclosure, in the apparatus for multimedia information processing provided by the present disclosure, the third display module is further used to: when detecting a third sliding operation for the third page, switch playing the first multimedia information updated and released by the target user in the third page; or when detecting a fourth sliding operation for the third page, switch playing the first multimedia information updated and released by different users in the third page.

According to one or more embodiments of the present disclosure, in the apparatus for multimedia information processing provided by the present disclosure, the sliding direction corresponding to the third sliding operation is different from the sliding direction corresponding to the fourth sliding operation.

According to one or more embodiments of the present disclosure, in the apparatus for multimedia information processing provided by the present disclosure, the apparatus for multimedia information processing further comprises: an adjustment module, used to adjust the display effect of the fourth identification according to the number of played first multimedia information that has updated and released by the target user.

According to one or more embodiments of the present disclosure, in the multimedia information processing apparatus provided by the present disclosure, the one or more fourth identifications constitute an edge portion of the user identification corresponding to the target user.

According to one or more embodiments of the present disclosure, the present disclosure provides an electronic device, comprising:
  one or more processors;
  a memory, used to store one or more programs;
  when the one or more programs are executed by the one or more processors, causes the one or more processors to implement any of the methods for multimedia information processing provided in the present disclosure.

According to one or more embodiments of the present disclosure, the present disclosure provides a computer-readable storage medium having a computer program stored thereon, which, when executed by a processor, implements any of the methods for multimedia information processing provided in the present disclosure.

The embodiments of the present disclosure further provide a computer program product including a computer program or an instruction, which, when executed by a processor, implements the methods for multimedia information processing as described above.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims.

What is claimed is:

1. A method for multimedia information processing, wherein the method comprises:
  displaying a second identification in a first page in accordance with a determination that one or more users do not update and release first multimedia information, and displaying a second page in response to detecting a trigger operation for the second identification, wherein the second page is used to shoot second multimedia information,
  in accordance with a determination that the one or more users have updated and released first multimedia information, updating the second identification in the first page to obtain a first identification, wherein updating the second identification in the first page to obtain the first identification comprises: adding a third identification to the second identification so as to cause the second identification to change into the first identification, the second identification and the third identification constituting the first identification, and wherein the first identification is used to identify that one or more users have updated and released the first multimedia information, and the one or more users include at least one of one or more second users associated with a first user who is a user currently using an application in which the method is performed;
  displaying user identifications corresponding to the one or more users who have updated and released the first multimedia information respectively in response to detecting a trigger operation for the first identification, wherein the user identifications corresponding to the one or more users who have updated and released the first multimedia information are not displayed in the first page before detecting the trigger operation for the first identification;
  displaying the first multimedia information that has been updated and released by a target user in response to detecting a trigger operation for the user identification of the target user among the one or more users;
  in response to detecting a first sliding operation for the first page, displaying the user identifications corresponding to the one or more users respectively; and
  in response to detecting a second sliding operation for the first page, displaying the second page;
  wherein the first sliding operation and the second sliding operation are the same continuous sliding operation, and the sliding distance corresponding to the second sliding operation is greater than the sliding distance corresponding to the first sliding operation.

2. The method according to claim 1, wherein the displaying user identifications corresponding to the one or more users respectively in response to detecting the trigger operation for the first identification, comprises:
  displaying user identifications corresponding to the one or more users respectively within a preset area of the first page in response to detecting the trigger operation for the first identification.

3. The method according to claim 2, wherein after the user identifications corresponding to the one or more users respectively are displayed within the preset area of the first page, the method further comprises:
  detecting a trigger operation for the first page, controlling the user identifications corresponding to the one or more users respectively to disappear from the preset area of the first page, and displaying at least one of the number of the first multimedia information that have been updated and released by the one or more users or the number of the users who have updated and released the first multimedia information on the first page.

4. The method according to claim 1, wherein updating the second identification in the first page to obtain the first identification comprises:

displaying the user identification corresponding to at least one user that has updated and released the first multimedia information at the corresponding position of the second identification, the user identification including the third identification and image information, and the third identification including edge portion of the user identification; and after a preset time, controlling the image information in the user identification at the corresponding position to disappear and to be replaced by the second identification, and keeping the third identification in the user identification at the corresponding position, wherein the second identification and the third identification constitute the first identification.

5. The method according to claim 1, wherein displaying the user identifications corresponding to the one or more users respectively comprises:

vertically displaying the user identifications corresponding to the one or more users respectively within a preset area of the first page along the direction of the first sliding operation.

6. The method according to claim 1, wherein the method further comprises:

increasing the display area of the second page along the direction of the second sliding operation; and when the second slide operation reaches the edge of the display component or a release instruction for the second slide operation is received, displaying the second page in full screen in the display component for shooting the second multimedia information.

7. The method according to claim 1, wherein the displaying user identifications corresponding to the one or more users respectively in response to detecting the trigger operation for the first identification comprises:

in response to detecting the trigger operation for the first identification, displaying a shooting identification and the user identifications corresponding to the one or more users respectively within a preset area of the first page.

8. The method according to claim 7, wherein after displaying the shooting identification and the user identifications corresponding to the one or more users respectively within the preset area of the first page, the method further comprises:

in response to detecting a trigger operation for the shooting identification, displaying the second page.

9. The method according to claim 1, wherein the displaying first multimedia information that has been updated and released by a target user in response to detecting a trigger operation for the user identification of the target user among the one or more users comprises:

in response to detecting the trigger operation for the user identification of the target user among the one or more users, displaying a third page which includes the first multimedia information that has been updated and released by the target user and one or more fourth identifications, wherein the number of fourth identifications is used to identify the number of the first multimedia information that the target user has updated and released.

10. The method according to claim 9, wherein after the third page is displayed, the method further comprises:

in response to detecting a third sliding operation for the third page, switching the playing of the first multimedia information updated and released by the target user in the third page; or in response to detecting a fourth sliding operation for the third page, switching to play the first multimedia information updated and released by a different user in the third page.

11. The method according to claim 10, wherein the sliding direction corresponding to the third sliding operation is different from the sliding direction corresponding to the fourth sliding operation.

12. The method according to claim 10, wherein after switching the playing of the first multimedia information updated and released by the target user on the third page, the method further comprises:

adjusting the display effect of the one or more fourth identifications according to the number of the first multimedia information updated and released by the target user that has been played.

13. The method according to claim 10, wherein the one or more fourth identifications constitute an edge portion of the user identification corresponding to the target user.

14. The method according to claim 1, wherein the one or more users further include the first user.

15. An electronic device, wherein the electronic device comprises:

one or more processors; and a storage for storing one or more programs;

wherein the one or more programs, when executed by the one or more processors, cause the one or more processors to implement the following operations for multimedia information processing:

displaying a second identification in a first page in accordance with a determination that one or more users do not update and release first multimedia information, and displaying a second page in response to detecting a trigger operation for the second identification, wherein the second page is used to shoot second multimedia information, in accordance with a determination that the one or more users have updated and released first multimedia information, updating the second identification in the first page to obtain a first identification, wherein updating the second identification in the first page to obtain the first identification comprises: adding a third identification to the second identification so as to cause the second identification to change into the first identification, the second identification and the third identification constituting the first identification, and wherein the first identification is used to identify that one or more users have updated and released the first multimedia information, and the one or more users include at least one of one or more second users associated with a first user who is a user currently using an application in which the operations for multimedia information processing are performed;

displaying user identifications corresponding to the one or more users who have updated and released the first multimedia information respectively in response to detecting a trigger operation for the first identification, wherein the user identifications corresponding to the one or more users who have updated and released the first multimedia information are not displayed in the first page before detecting the trigger operation for the first identification;

displaying the first multimedia information that has been updated and released by a target user in response to detecting a trigger operation for the user identification of the target user among the one or more users;

in response to detecting a first sliding operation for the first page, displaying the user identifications corresponding to the one or more users respectively; and in response to detecting a second sliding operation for the first page, displaying the second page;

wherein the first sliding operation and the second sliding operation are the same continuous sliding operation, and the sliding distance corresponding to the second sliding operation is greater than the sliding distance corresponding to the first sliding operation.

16. A non-transitory computer-readable storage medium having a computer program stored thereon, wherein the program, when executed by a processor, implement the following operations for multimedia information processing:

displaying a second identification in a first page in accordance with a determination that one or more users do not update and release first multimedia information, and displaying a second page in response to detecting a trigger operation for the second identification, wherein the second page is used to shoot second multimedia information, in accordance with a determination that the one or more users have updated and released first multimedia information, updating the second identification in the first page to obtain a first identification, wherein updating the second identification in the first page to obtain the first identification comprises: adding a third identification to the second identification so as to cause the second identification to change into the first identification, the second identification and the third identification constituting the first identification, and wherein the first identification is used to identify that one or more users have updated and released the first multimedia information, and the one or more users include at least one of one or more second users associated with a first user who is a user currently using an application in which the operations for multimedia information processing are performed;

displaying user identifications corresponding to the one or more users who have updated and released the first multimedia information respectively in response to detecting a trigger operation for the first identification, wherein the user identifications corresponding to the one or more users who have updated and released the first multimedia information are not displayed in the first page before detecting the trigger operation for the first identification;

displaying the first multimedia information that has been updated and released by a target user in response to detecting a trigger operation for the user identification of the target user among the one or more users;

in response to detecting a first sliding operation for the first page, displaying the user identifications corresponding to the one or more users respectively; and in response to detecting a second sliding operation for the first page, displaying the second page;

wherein the first sliding operation and the second sliding operation are the same continuous sliding operation, and the sliding distance corresponding to the second sliding operation is greater than the sliding distance corresponding to the first sliding operation.

* * * * *